United States Patent [19]

Galanis et al.

[11] 4,099,244
[45] Jul. 4, 1978

[54] RECALIBRATION SYSTEM FOR ELECTRO-OPTICAL GAGE

[75] Inventors: Tom L. Galanis; Joel L. Hoffner; John C. Clymer, all of Bethlehem, Pa.

[73] Assignee: Bethlehem Steel Corporation, Bethlehem, Pa.

[21] Appl. No.: 778,811

[22] Filed: Mar. 17, 1977

[51] Int. Cl.² .................. B21B 37/00; G06F 15/46
[52] U.S. Cl. .................. 364/571; 364/472; 72/37
[58] Field of Search .......... 235/151.3, 151.1; 72/37.8; 29/DIG. 32; 356/158, 160, 167, 159, 156; 358/101, 107

[56] References Cited

U.S. PATENT DOCUMENTS

| | | | |
|---|---|---|---|
| 3,676,652 | 7/1972 | Millis, Jr. et al. | 235/151.1 X |
| 3,713,313 | 1/1973 | Spradlin | 235/151.1 X |
| 3,854,822 | 12/1974 | Altman et al. | 356/156 |
| 3,902,811 | 9/1975 | Altman | 356/156 |

OTHER PUBLICATIONS

A Microprocessor-Based Gauge Controller for Metals Rolling Applications; D. M. Hershberger, J. G. Underwood; IEEE Transactions On Industrial Electronics and Control Instrumentation, vol. IECI-22, No. 3, pp. 333-337, Aug. 1975.

Primary Examiner—Edward J. Wise
Attorney, Agent, or Firm—Joseph J. O'Keefe; Michael J. Delaney; George G. Dower

[57] ABSTRACT

Computerized electro-optical system gages dimension of a moving hot bar. Back-lighted electronic camera head generates high-speed bar shadow pulses which represent the bar dimensions. Bar pulses are processed by way of camera electronics and a digital computer. CRT and printing terminals, interacting with the computer, indicate and/or record a recalibration mask table and a cold-size bar diameter measurement.

Camera head electronics includes camera AGC, a digital type one-axis bidirectional linear sweep, bar pulse edge-detection with an autocorrelator to remove noise and enhance the bar pulse, and a digital accumulator of digital bar size signals. The digital computer assimilates bar size along with bar temperature, aim size, and other data signals. The computer is programmed to: (a) compensate bar size signals for bar temperature; (b) calibrate the gage off-line and automatically recalibrate the gage on-line to correct for drift and slope errors; and (c) communicate with the CRT and printing terminals and an exterior control system.

16 Claims, 46 Drawing Figures

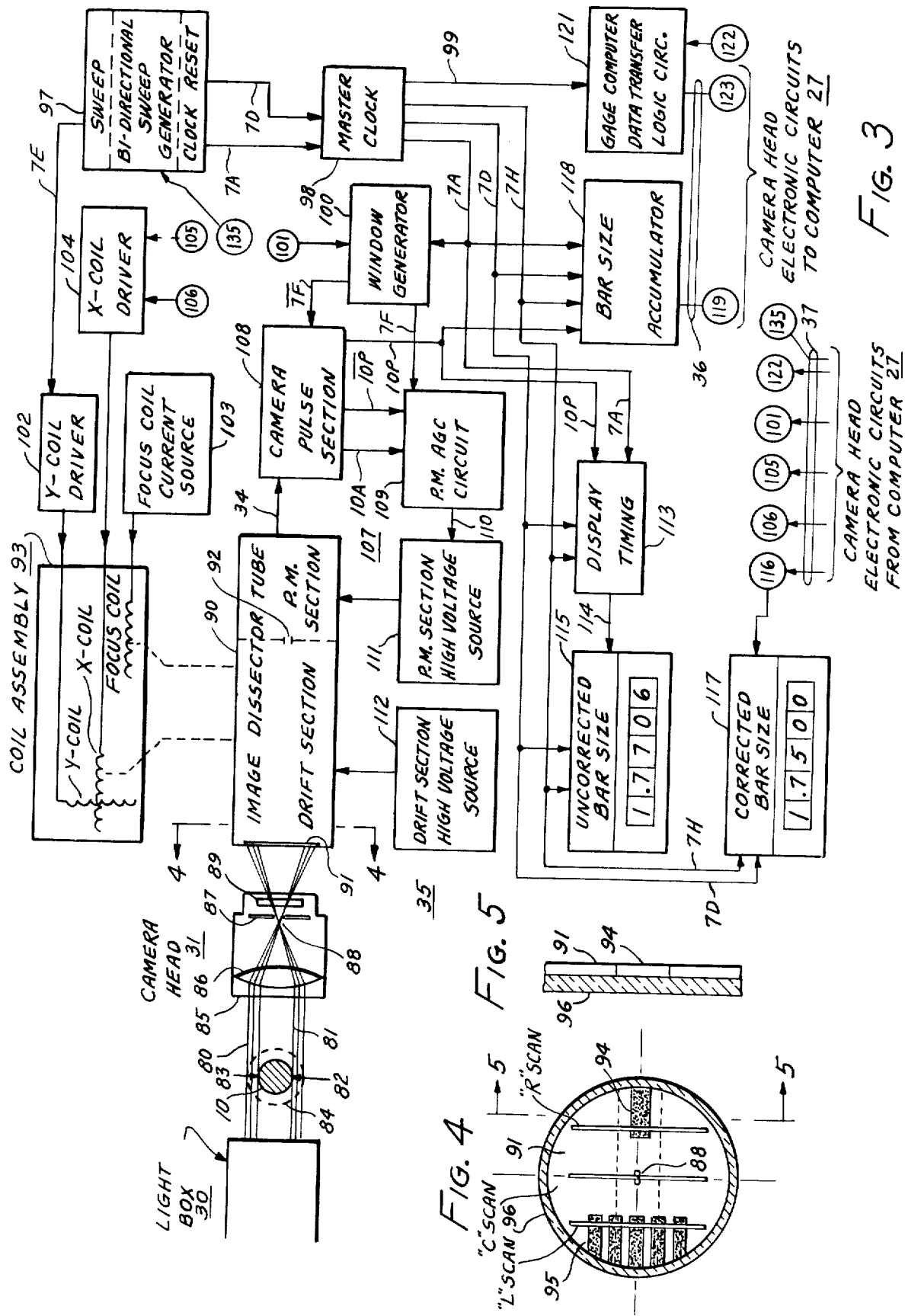

HEXADECIMAL CORE MAP

| TYPE | NAME | POSITION IN COMMON AREA | COMMON NAME | CORE LOCATION | DESCRIPTION |
|---|---|---|---|---|---|
| ARRAY | IFLDC1 | 0030 | IN | FCOMP1 | 9700 | HEAD 1 FIELD OF VIEW COMPENSATION MAP |
| VARIABLE | IMULT1 | 0000 | IN | CORCOM | 9900 | HEAD 1 SLOPE CORRECTION |
| VARIABLE | IOFST1 | 0002 | IN | CORCOM | 9902 | HEAD 1 OFFSET CORRECTION |
| VARIABLE | ITMP1 | 0000 | IN | TMPOFF | 9904 | HEAD 1 AUTO-RECALIBRATION SLOPE CORRECTION |
| VARIABLE | IMASK1 | 0000 | IN | MSKCOM | 9906 | HEAD 1 RIGHT MASK REFERENCE VALUE |
| VARIABLE | IWINDX | 0002 | IN | MSKCOM | 9908 | WINDOW FOR NO X DEFLECT & RIGHT DEFLECT FOR HEAD 1 |
| VARIABLE | IGAGDM | 0003 | IN | MSKCOM | 9909 | SPARE - NO FUNCTION |
| ARRAY | ILFMSK | 0000 | IN | LEFTCL | 990A | LEFT MASK REFERENCE VALUES FOR HEAD 1 |
| ARRAY | IWINDO | 000A | IN | LEFTCL | 9914 | WINDOWS FOR EACH LEFT MASK ON HEAD 1 |
| VARIABLE | NSAMPL | 0006 | IN | MASGAG | 9E62 | THE NUMBER OF SAMPLES TO BE AVERAGED PER READING |
| ARRAY | IBDGT2 | 0065 | IN | MASGAG | 9EC1 | HISTOGRAM TABLE FOR HEAD 1 |
| VARIABLE | IDVLIM | 0161 | IN | MASGAG | 9FBD | MAXIMUM ALLOWABLE DEVIATION |
| VARIABLE | ICLFLG | 0162 | IN | MASGAG | 9FBE | CALIBRATION FLAG (PREVENTS CALLS TO CMPNST) |
| VARIABLE | IDEV1 | 0163 | IN | MASGAG | 9FBF | DEVIATION OF HEAD 1 FOR A SINGLE READING |
| VARIABLE | IPOS1 | 0165 | IN | MASGAG | 9FC1 | BAR POSITION OF HEAD 1 FOR A SINGLE READING |
| VARIABLE | NGOOD1 | 0167 | IN | MASGAG | 9FC3 | FOR HEAD 1 - # OF GOOD SAMPLES AVERAGED IN A READING |
| VARIABLE | IERR | 0000 | IN | GAGERR | 57FB | GAGE ERROR CODE |
| VARIABLE | IRECAL | 0001 | IN | GAGERR | 57FC | RECALIBRATION FLAG (FALSE = NO RECALIBRATION DONE) |
| VARIABLE | IHMD2 | 0001 | IN | BDCCOM | 5701 | HOT METAL DETECTOR - FINISHING STAND |
| VARIABLE | ICDAIM | 0028 | IN | BDCCOM | 5728 | COLD AIM SIZE |
| VARIABLE | IGRADE | 0029 | IN | BDCCOM | 5729 | % CARBON |
| VARIABLE | IHAIM1 | 002A | IN | BDCCOM | 572A | HOT AIM SIZE FOR HEAD 1 |
| VARIABLE | ISEC | 0000 | IN | MONCOM | 5400 | CURRENT SECONDS |
| VARIABLE | IMIN | 0001 | IN | MONCOM | 5401 | CURRENT MINUTES |
| VARIABLE | IHOUR | 0002 | IN | MONCOM | 5402 | CURRENT HOUR |
| VARIABLE | IMONTH | 0005 | IN | MONCOM | 5405 | CURRENT MONTH |
| VARIABLE | IDATE | 0006 | IN | MONCOM | 5406 | CURRENT DATE |
| VARIABLE | IYEAR | 0007 | IN | MONCOM | 5407 | CURRENT YEAR |
| VARIABLE | ITMP22 | 0001 | IN | SYSCOM | 5450 | BAR TEMPERATURE AT FINISHING STAND |
| ARRAY | ITRABF | 0000 | IN | TRKCOM | 5580 | TOLERANCE LIMITS FOR CURRENT BAR AT FINISHING STAND |

FIG. 15

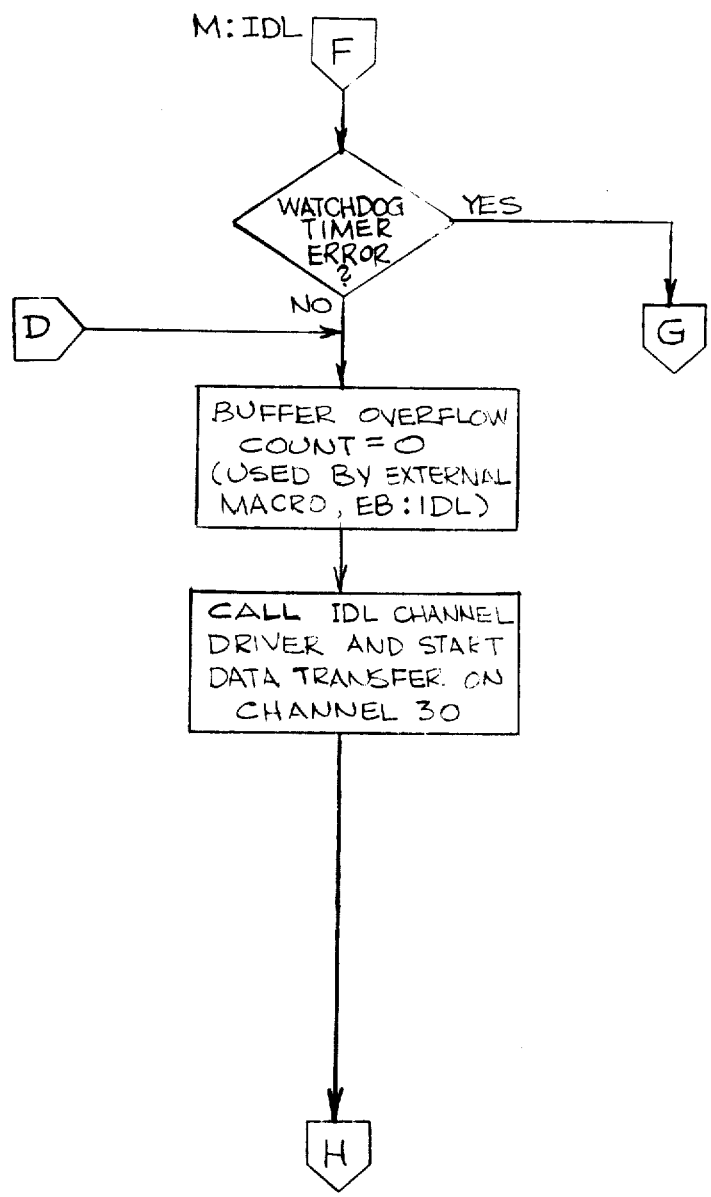
FIG.—16D

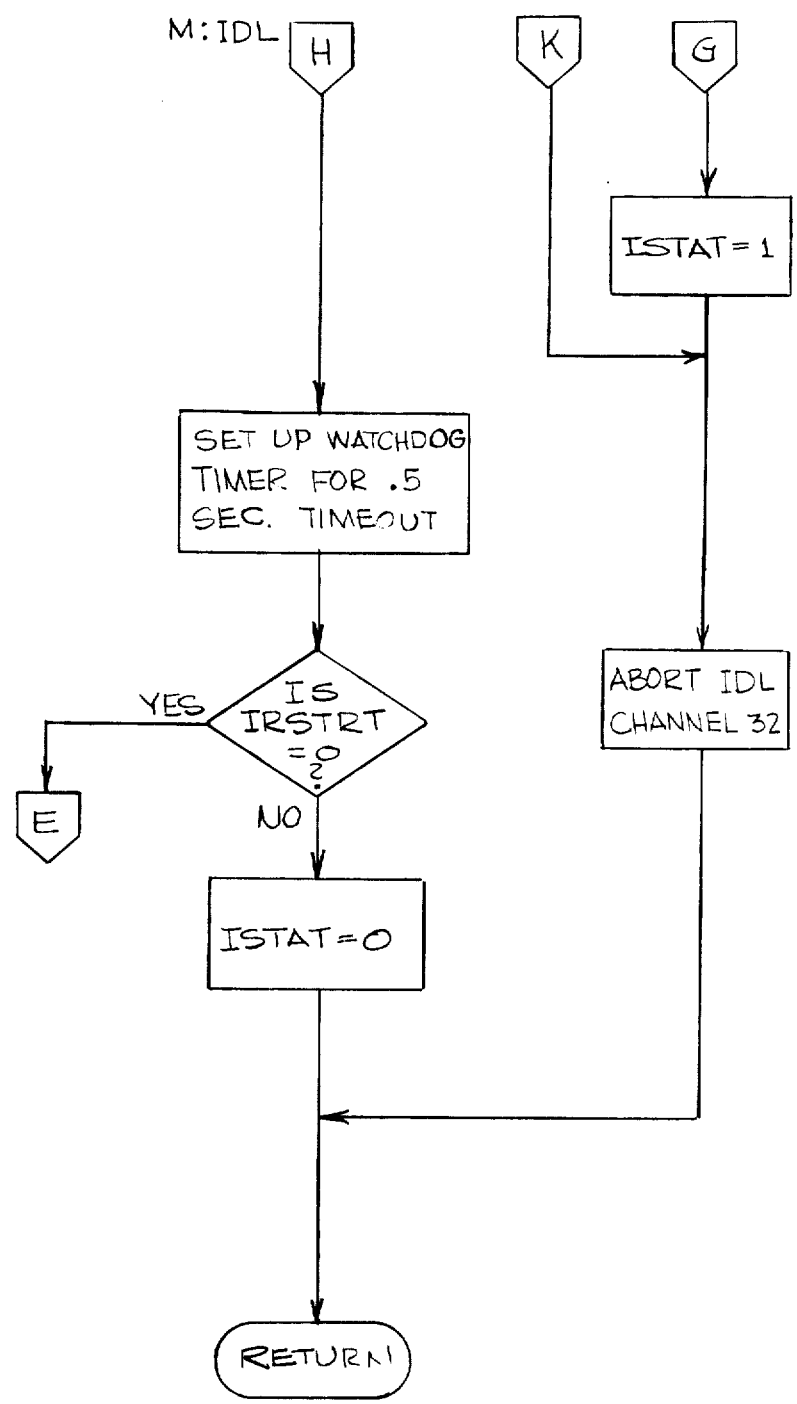
FIG.—16E

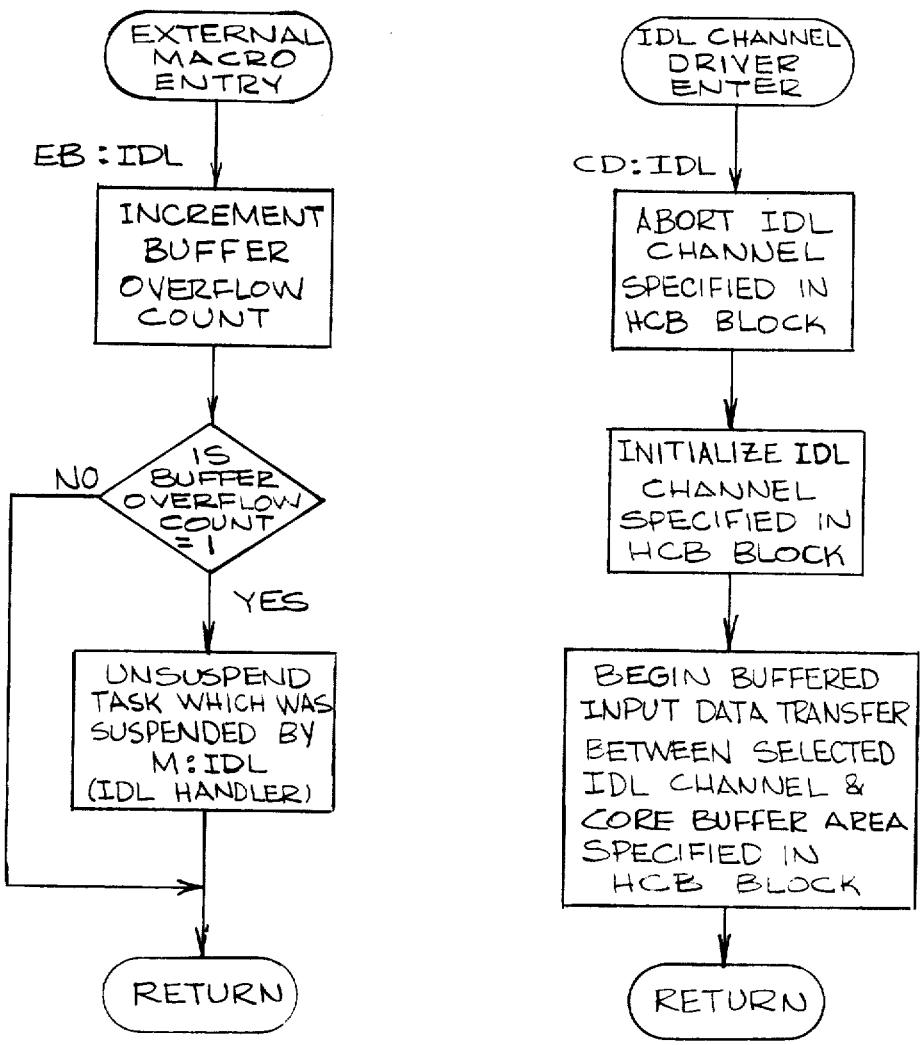
FIG.—18   FIG.—17

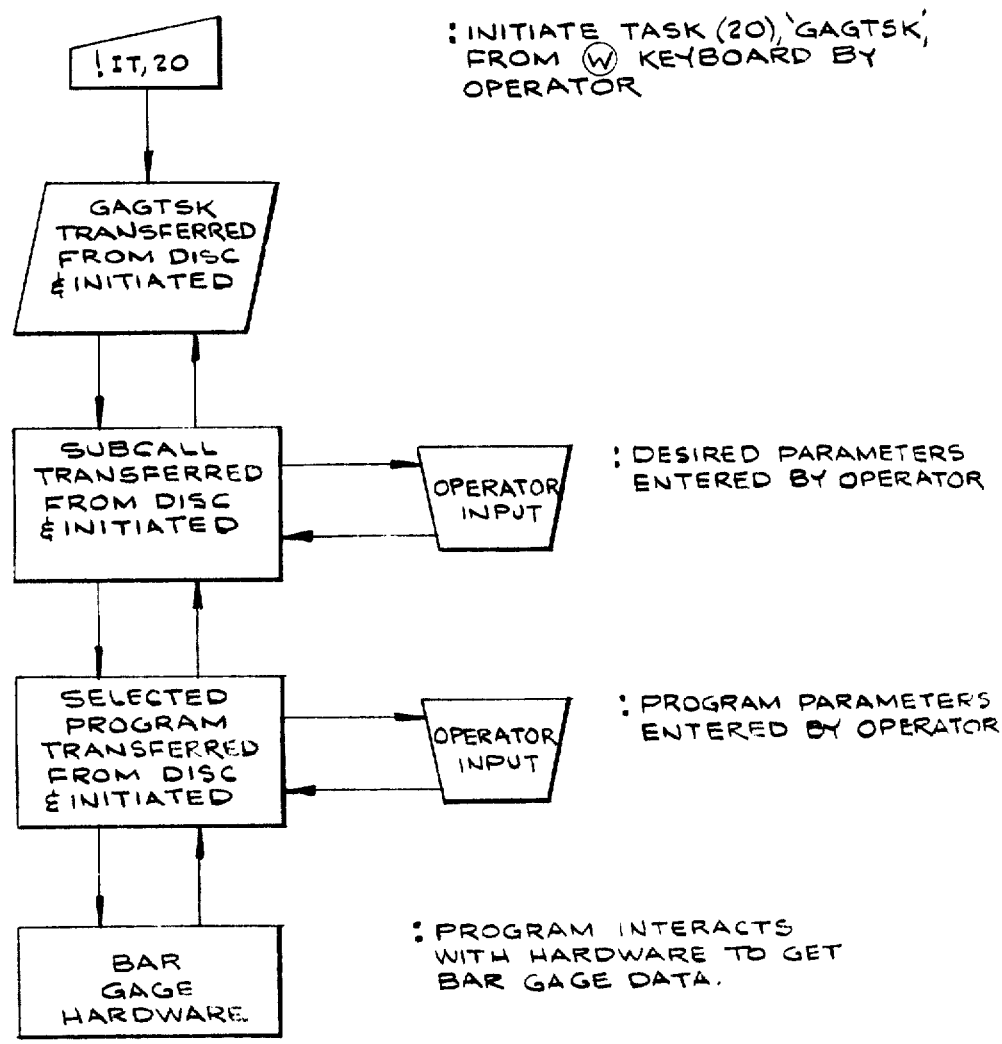
Fig.—19A

```
                       GAGE OFFLINE SYSTEM

MNEMONICS ARE AS FOLLOWS:

MP - BUILDS FIELD OF VIEW COMPENSATION MAPS
TY - PRINTS MAPS, SLOPE & OFFSET FACTORS, AND MASK VALUES
OF - ALLOWS ENTRY OF SLOPE AND OFFSET CORRECTION FACTORS
ZE - ZEROES ALL MAPS AND CORRECTION FACTORS !!!CAUTION!!!
TR - DISK TRANSFER OF GAGE COMMON TO CONTROL SYS. AREA
XT - EXITS TO MONITOR AND ATTEMPTS TO WRITE COMMON AREA
     CONTAINING MAPS, SLOPE AND OFFSET CORRECTION FACTORS,
     AND WINDOW VALUES TO THE DISK.  THE DISK FILE WILL
     ONLY BE UPDATED IF DISK SWITCH 12 IS UP.  THIS FILE
     IS READ FROM THE DISK WHEN THIS TASK (20) IS CALLED
     BY THE MONITOR.
```

*FIG. 20B*

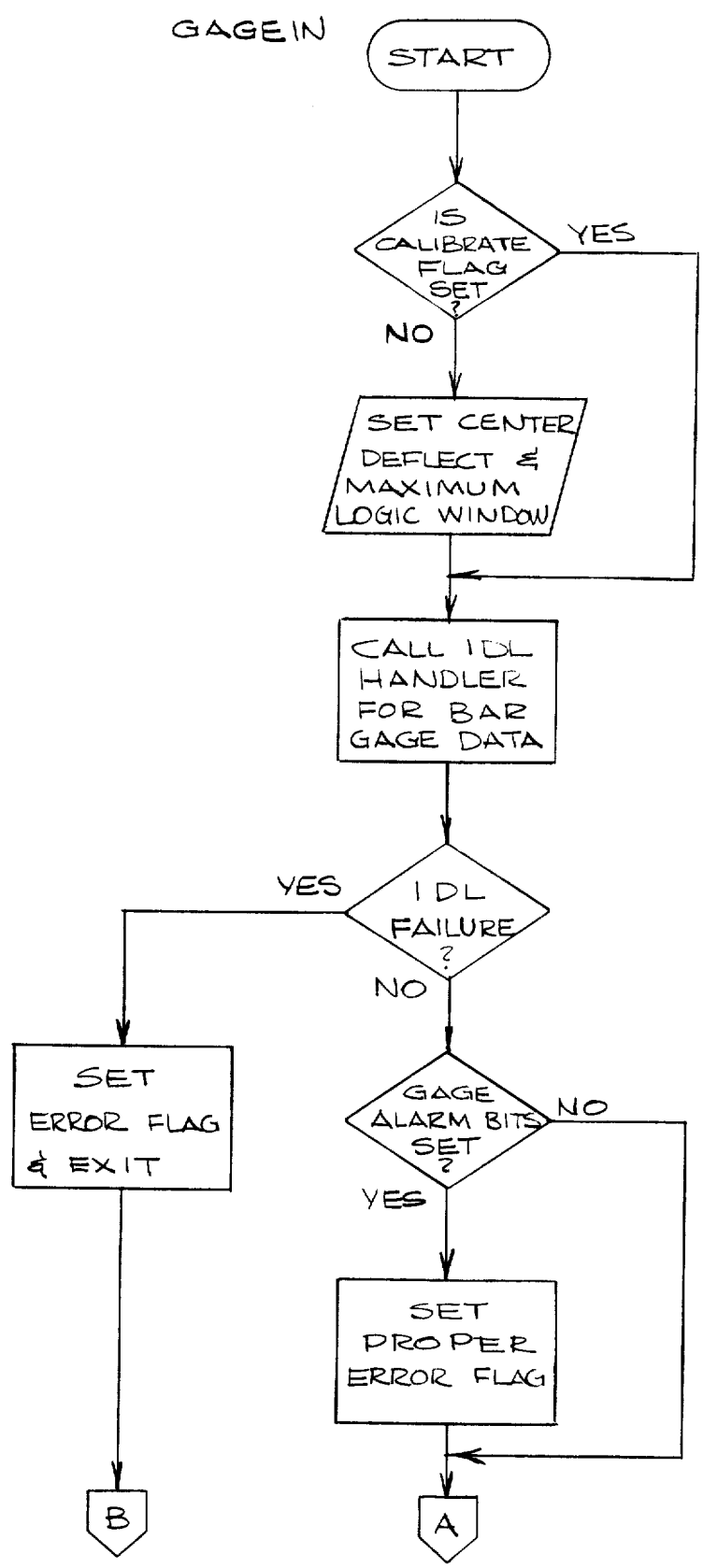
FIG.—22A

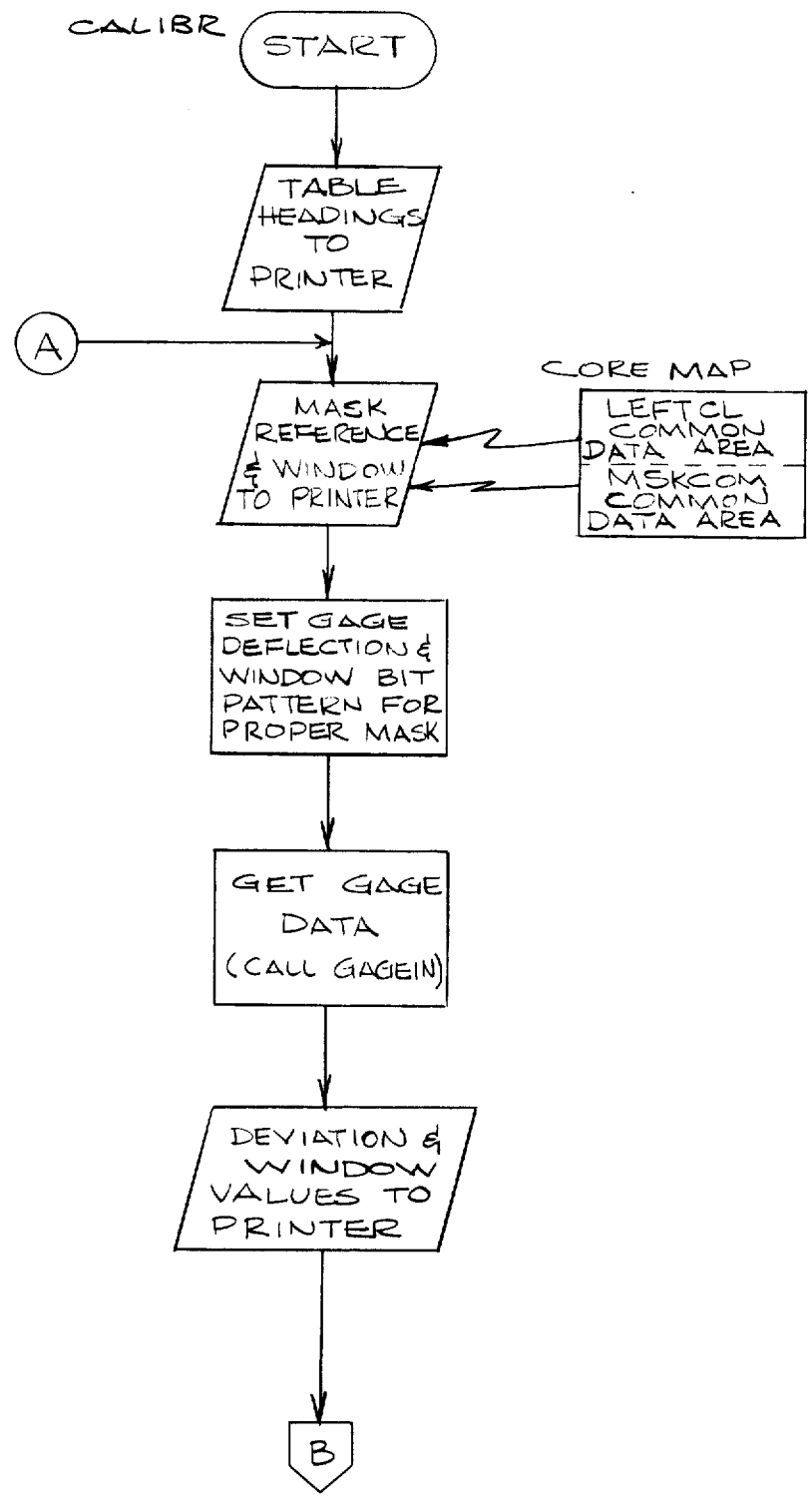
FIG.—24A

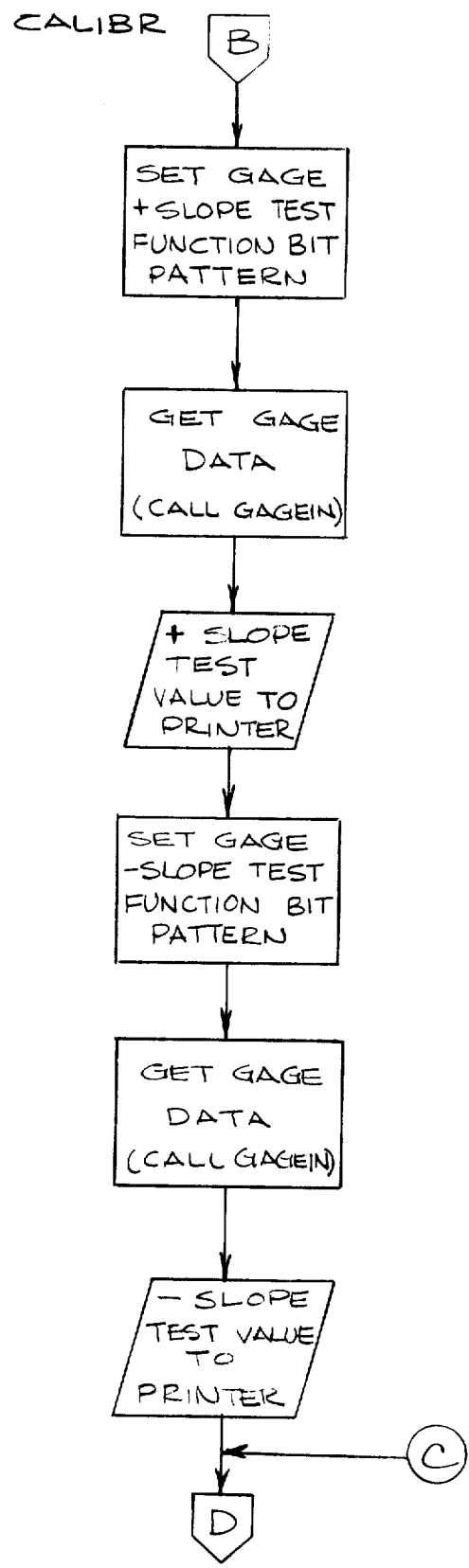
FIG.—24B

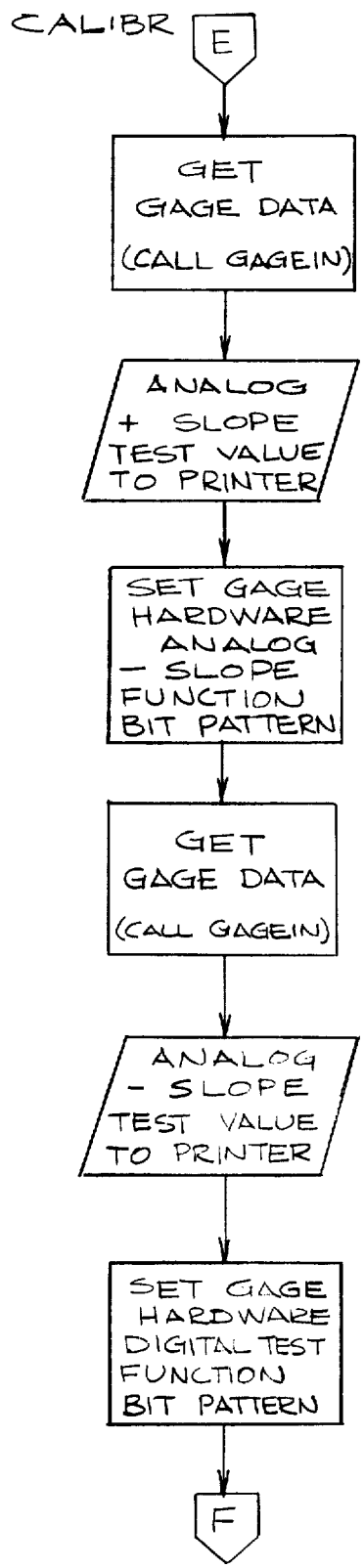
FIG.—24D

```
                    GAGE   CALIBRATION   CHECK

DATE                    TIME
                                HEAD 1      WINDOW
        LEFT MASK 1             0.2158      00AA
        LEFT MASK 1 DEVIATION   0.0000      00AA
        LEFT MASK 1 (+) SLOPE      172      00AA
        LEFT MASK 1 (-) SLOPE      176      00AA

LEFT MASK 2             0.2140      012E
        LEFT MASK 2 DEVIATION   0.0000      012E
        LEFT MASK 2 (+) SLOPE      174      012E
        LEFT MASK 2 (-) SLOPE      178      012E

LEFT MASK 3             0.2142      0191
        LEFT MASK 3 DEVIATION  -0.0002      0191
        LEFT MASK 3 (+) SLOPE      174      0191
        LEFT MASK 3 (-) SLOPE      180      0191

LEFT MASK 4             0.2148      01F4
        LEFT MASK 4 DEVIATION   0.0000      01F4
        LEFT MASK 4 (+) SLOPE      174      01F4
        LEFT MASK 4 (-) SLOPE      178      01F4

LEFT MASK 5             0.2170      0278
        LEFT MASK 5 DEVIATION   0.0000      0278
        LEFT MASK 5 (+) SLOPE      168      0278
        LEFT MASK 5 (-) SLOPE      170      0278

RIGHT MASK              0.5006      005C
        RIGHT MASK DEVIATION   -0.0002      005C
        RIGHT MASK (+) SLOPE       178      005C
        RIGHT MASK (-) SLOPE       182      005C
        CALIBRATION CONSTANTS   0.0002

ANALOG TEST             1.0262      005C
        ANALOG TEST (+) SLOPE      144      005C
        ANALOG TEST (-) SLOPE      142      005C

DIGITAL TEST            1.0242
```

FIG. 24F

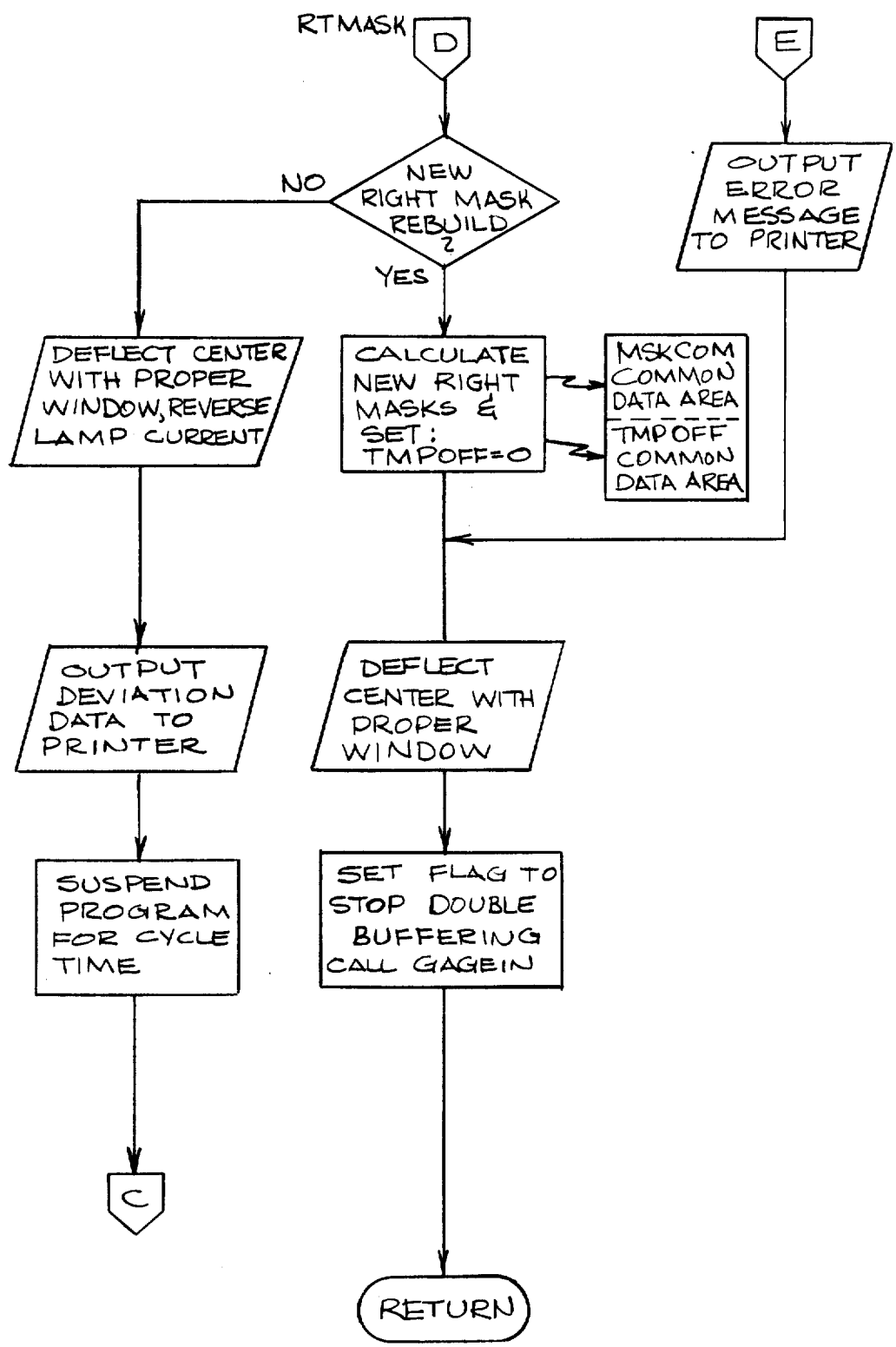
FIG.—25c

TYPE A 1 TO ENTER WINDOW.

o

ENTER 1 FOR RIGHT MASK REBUILD o

ENTER CYCLE TIME IN SECONDS - XXX o10

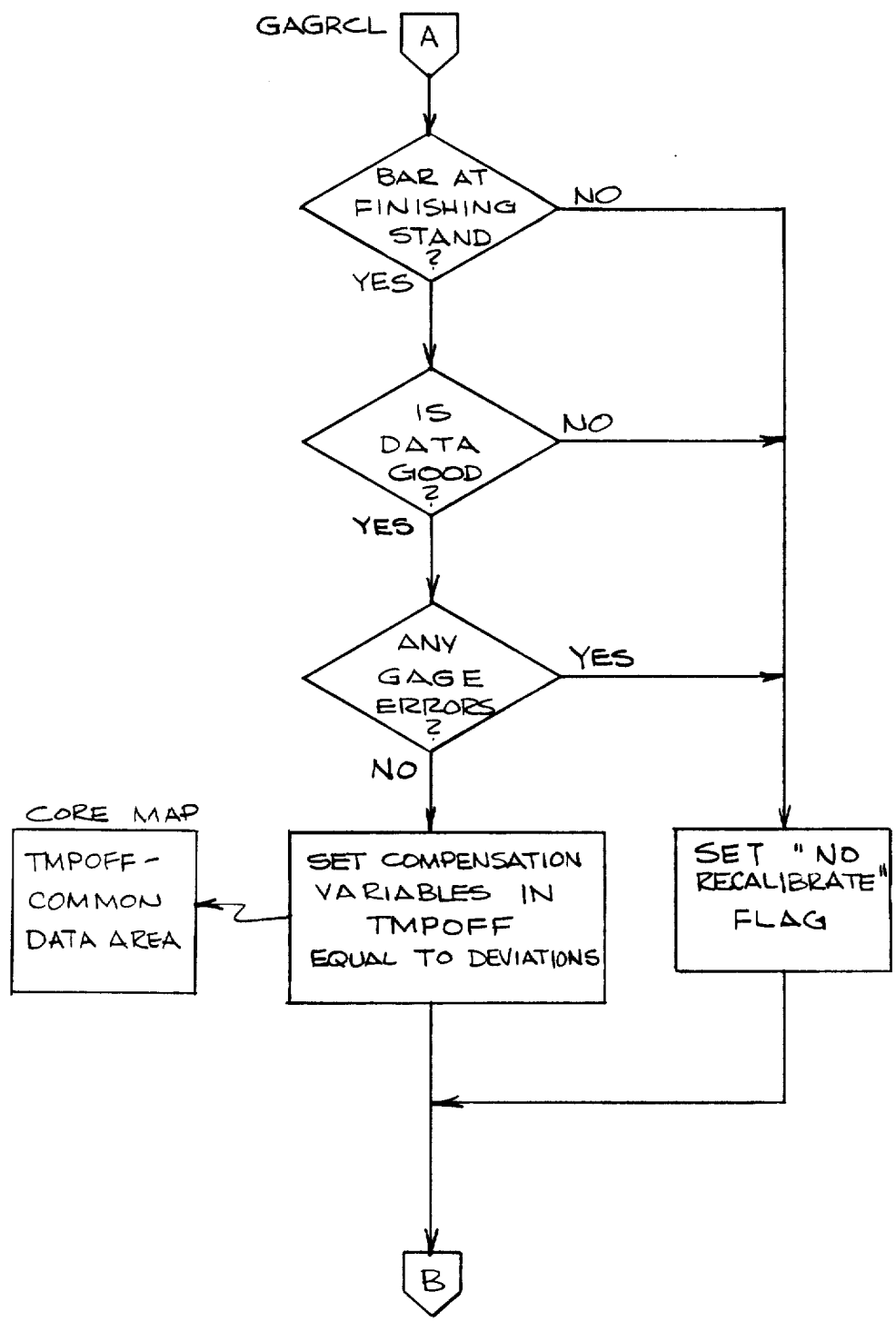
FIG.—26B

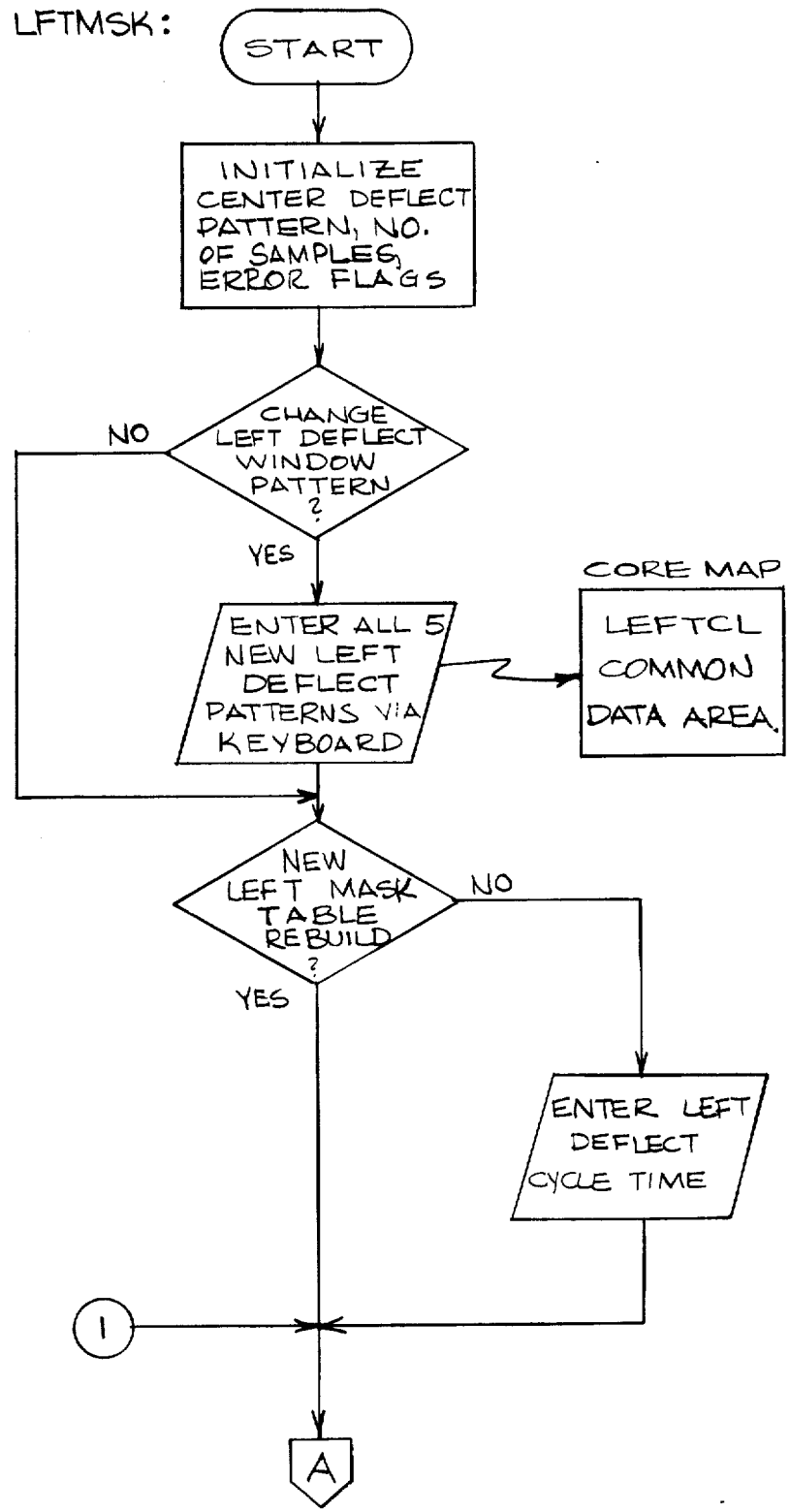
FIG.—27A

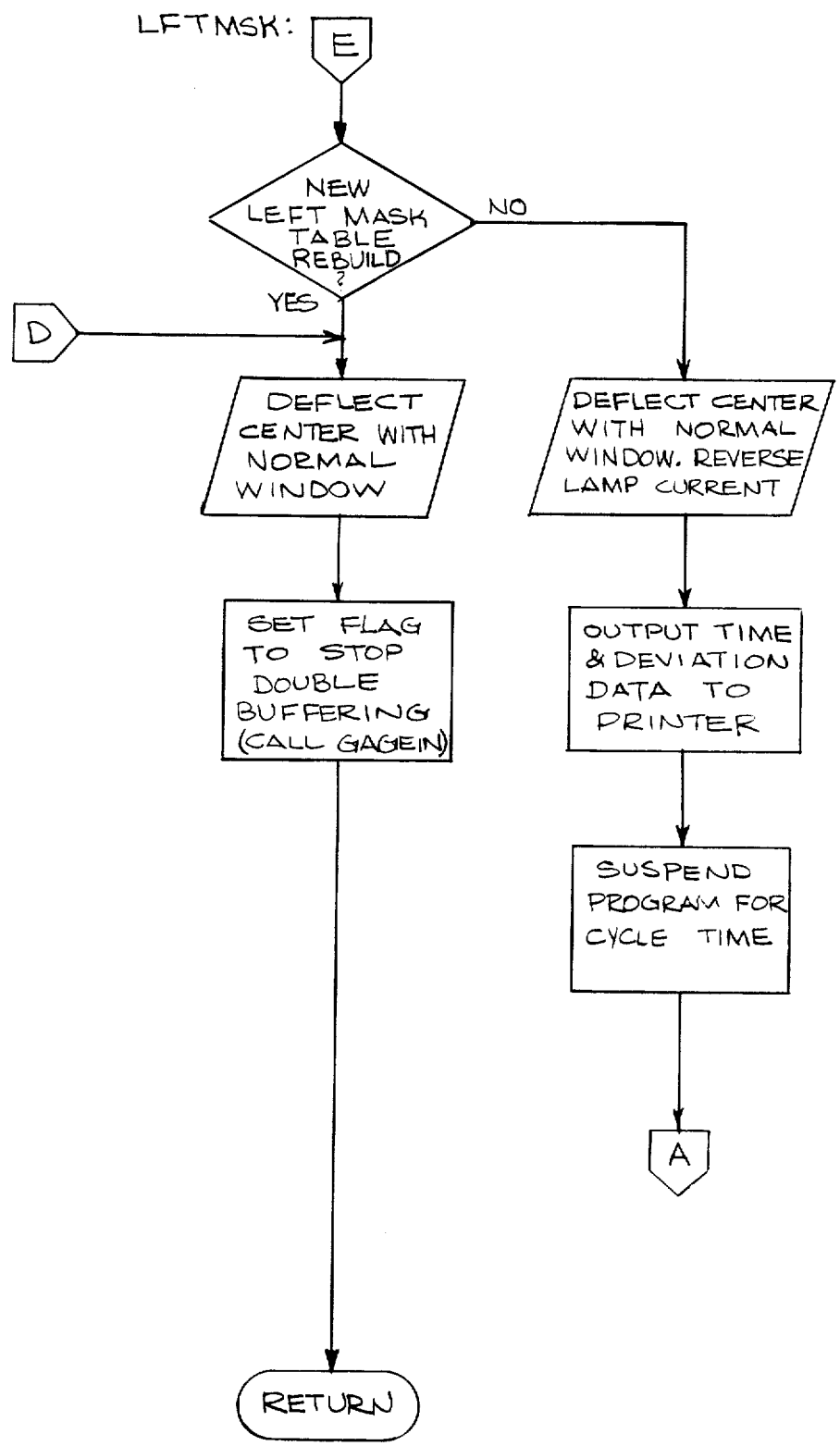
FIG.—27D

TYPE A 1 TO ENTER NEW LEFT MASK WINDOWS.

0

TYPE A 1 FOR LEFT MASK TABLE REBUILD

0

ENTER CYCLE TIME IN SECONDS - XXX

020

| | | | | | |
|---|---|---|---|---|---|
| 20:23:10 | 0 | 0 | 0 | 0 | 0 |
| 20:23:46 | 0 | 0 | 1 | 0 | 0 |
| 20:24:22 | 0 | -1 | 0 | 0 | 0 |
| 20:24:57 | 0 | 0 | 0 | 0 | 0 |
| 20:25:33 | 0 | 0 | 0 | 0 | 0 |

FIG. 27E

RECALIBRATION SYSTEM FOR ELECTRO-OPTICAL GAGE

CROSS-REFERENCES TO RELATED APPLICATIONS

The following co-pending applications owned by the same assignee are incorporated as follows:

| Cross-Reference | Title |
|---|---|
| (A) | "Scanning Pyrometer System", by J. J. Roche et al Serial No. 522,363, filed 11-8-74. |
| (B) | "Magnetically Shielded Image Dissector Tube Assembly" by J. C. Clymer et al, filed concurrently herewith. |

BACKGROUND OF THE INVENTION

1. Field of the Invention

This invention relates broadly to electro-optical gaging methods and systems. More particularly, this invention relates to an electro-optical method and system for gaging dimensions of an object and automatically recalibrating the gaging system. The invention may be used to determine a lateral dimension of a moving hot bar during bar rolling in a steel mill as is disclosed herein. Similarly, the invention may be used to gage the dimensions of other shaped objects and in other environments as well.

2. Description of the Prior Art

Generally, in steel mills where hot round bars are rolled, productivity demands require that a variety of bars be rolled at speed of up to 4000 ft./min. (1219 m./min.) and sizes of up to three inches in diameter (7.62 cm.) while the bar rolling temperature is about 1700° F. (930° C.). Further demands require that the specifications on finished cold bar size and out-of-roundness be within one-half existing commercial tolerances. In order to meet these requirements, a computer-controlled rolling process must be implemented that will combine order data with operating measurements to produce mill control signals that will maximize productivity while minimizing, or desirably eliminating, off-specification product.

Some of the operating data used in mill control computer calculations and referred to herein are: desired bar diameter, or aim size; aim size full- and half-commercial tolerances; and bar grade, or percent carbon composition of the bar to be rolled. One of the operating measurements mentioned above and of particular importance is: actual bar diameter, or bar size. Another operating measurement is bar temperature, a parameter used to correct for hot bar shrinkage in both bar measurement and computer control aspects of mill operation.

In order that the mill control computer may be programmed to meet the strict requirements of mill speed, bar size and size half-tolerances, it is desirous that all operating measurements have the following characteristics. Bar size measurements be made when the bar vibrates in a lateral orbit while moving longitudinally during rolling; be made are repetitive rates of about 300 Hz.; have a resolution of 0.0005"; have an absolute accuracy equivalent to one-quarter commercial tolerance; maintain a high degree of reliability; all measurements made under the severe environment normally present in a steel rolling mill. Bar temperature measurements should have similar characteristics.

Several types of electro-optical gaging systems are available to measure bar size. One early type of bar size gaging system operates on the self-illumination principle in which chopped infrared radiation from the hor bar is imaged through a lens onto an infrared detector. Elementary edge-detection circuitry was used in an attempt to define raw detector pulses in relation to bar edges.

Three more recent electro-optical systems applicable to bar size measurements operate on the principle of back-lighting a test object to be measured and imaging a shadow of the object through a lens onto the face of an electronic camera. In one such gaging system, a scanning laser beam illuminates the test object and the lens system focuses the object shadow onto a phototransistor. In a second such gaging system, a stationary light source of fixed intensity illuminates the test object and the lens system focuses the object shadow onto an electronically scanned image orthicon tube having two-axis unidirectional scanning. In the third such system, the image orthicon tube is replaced by a self-scanning photodiode array.

The photoresponsive device in each of the three back-lighted gaging systems generates a raw camera pulse having a width that approximates the object dimension between shadow edges. Raw camera pulses are processed in edge detection circuitry having either plain differentiators or gated differentiators which further attempt to more closely define camera pulse width in relation to the object dimension.

Each of the foregoing prior art electro-optical bar size gaging systems has met with varying degrees of success in certain types of installations. However, none of these gaging systems is entirely satisfactory to use as a bar dimension gaging system in the environment of a contemporary high-speed hot steel bar rolling mill. Such gaging systems fail to meet the foregoing measurement requirements for one or more of the following reasons.

Difficulties with prior art gaging systems are first, the object to be measured must be confined to a given position in the camera field-of-view. Second, inability to provide sufficient camera speed-of-response and/or camera resolution. Third, inability to meet system accuracy at high repetition rates because considerable switching noise occurs at such measuring speeds and differentiator noise is also particularly troublesome. In addition, some environmental electrical noise is present in varying degrees which further compounds the problem of making definitive bar measurements at high speeds and high reliability. Fourth, instability which causes drift in system calibration and the lack of an automatic recalibration system. Fifth, inability to compensate or correct for distortion resulting from high frequency lateral vibration of the bar.

SUMMARY OF THE INVENTION

A main object of this invention is to provide an improved electro-optical gaging method and system.

One other object of this invention is to provide an improved electro-optical gaging method and system which has a high response speed, a high repetition rate of measurement, a high accuracy, a high stability and/or a high reliability in the environment of a contemporary high-speed hot steel bar rolling mill.

Another object of this invention is to provide an improved electro-optical gaging method and system which determines object size.

Still another object of this invention is to provide an improved electro-optical gaging method and system which processes a camera signal to remove noise combined with an object size pulse in the camera signal, thereby permitting precise definitions of the object size pulse.

Yet another object of this invention is to provide an improved electro-optical gaging method and system which corrects camera object size signals for object temperature, and changes in calibration.

Still a further object of this invention is to provide an improved electro-optical gaging method and system which displays and/or records a controlled dimension of the object gaged.

The foregoing objects may advantageously be attained for use in a hot bar rolling mill, for example, by a computerized electro-optical system for gaging a dimension of a moving and vibrating hot bar by using a back-lighted electronic camera head. The camera head is provided with electronics which include camera AGC and a digital bidirectional sweep generator for one-axis scan of the camera. Additional electronics process a bar shadow pulse in pulse edge-detection circuitry having an autocorrelator to remove noise. Other electronics include a digital accumulator which provides digital bar size.

The camera's bar size bar temperature, aim size, and other signals are assimilated by a digital computer which is programmed to perform the following functions either off-line or on-line. First, correct the bar size signal for temperature. Second calibrate the gage off-line and automatically recalibrate the gage on-line to offset calibration drift and slope errors. Third, facilitate interaction with CRT and printing terminals to indicate and/or record the camera's correct bar diameter measurement after automatic recalibration of the gaging system. The computer is adapted to communicate corrected bar diameter data to a rolling mill control system when requested by the control system.

BRIEF DESCRIPTION OF THE DRAWINGS

FIG. 3 is a block diagram of camera electronics for the camera system shown in FIG. 1.

FIG. 4 is a sectional view of a masked photocathode used in an image dissector tube used in the FIG. 3 camera electronics.

FIG. 5 is a cross-sectional view of the masked photocathode shown in FIG. 4.

FIG. 15 is a computer CORE MAP.

FIGS. 16A—E, 17, 18, 19A–B, 20A–B and 21 are flow charts of computer SERVICE PROGRAMS.

FIGS. 22A-B are flow charts of computer BAR GAGE DATA PROGRAM.

FIGS. 24A-F are flow charts of computer CALIBRATION PROGRAM.

Figure 25D:
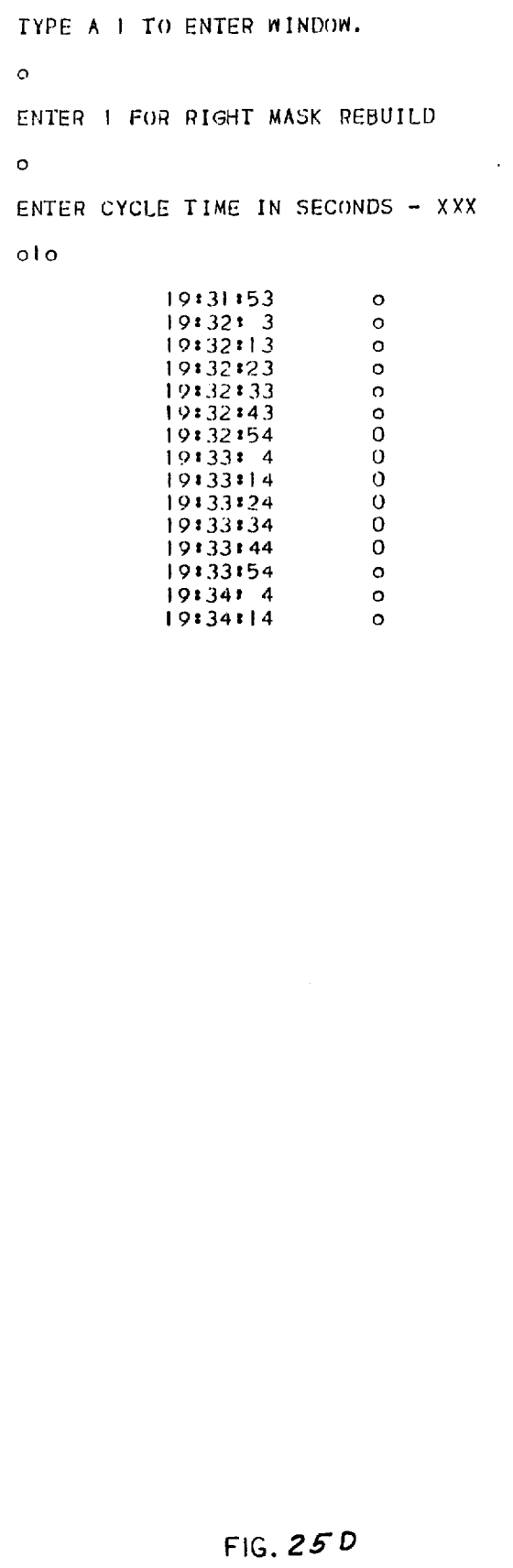

FIGS. 25A-D, 26A-B and 27A-E are flow charts of computer RECALIBRATION PROGRAMS.

DESCRIPTION OF THE PREFERRED EMBODIMENT

Figure 1:
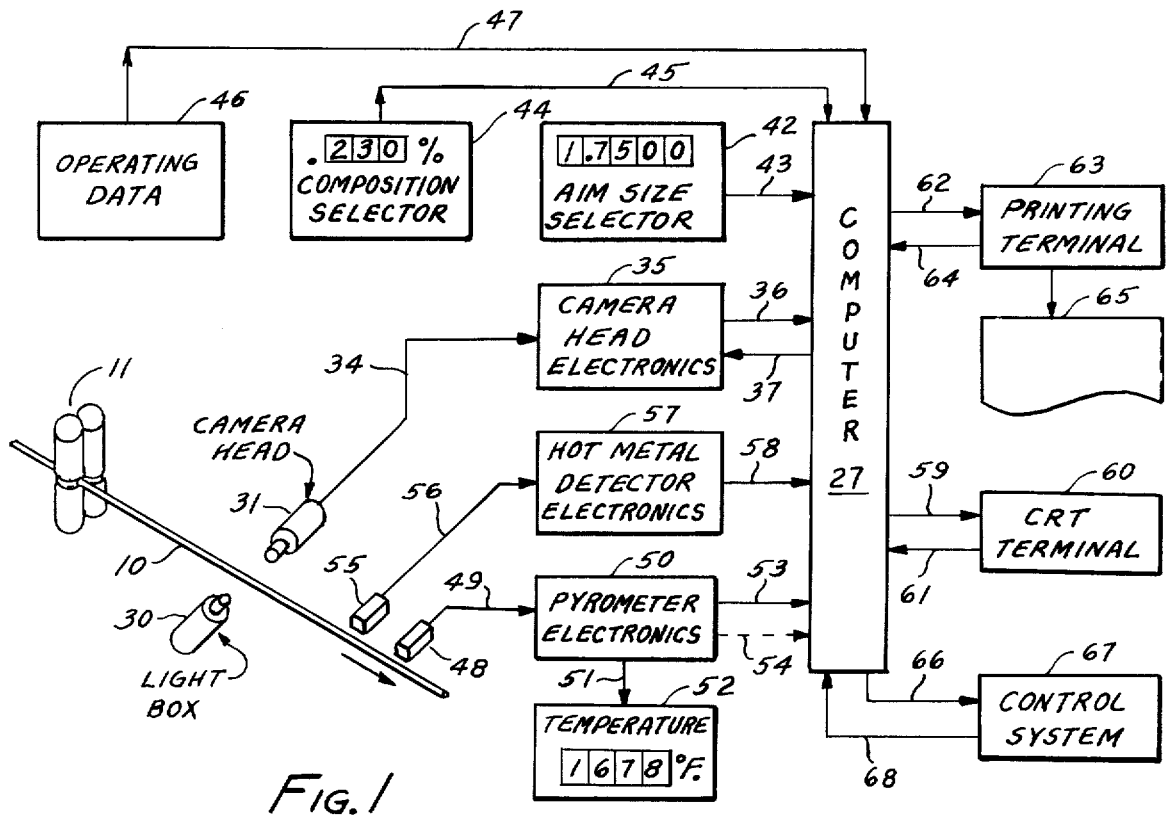
FIG. 1 is a block diagram of the overall computerized electro-optical gaging system.

Referring now to the drawings, particularly FIG. 1, there is shown a computerized electro-optical gaging system having a back-lighted camera mounted in a hot steel bar rolling mill. The gaging system measures the diameter of bar 10, for example, beyond the exit side of roll stand 11. As explained below, the bar diameter signal is fed to a computer which corrects it for bar temperature and calibration drift. Ultimately, the corrected bar diameter data is displayed, recorded and transmitted to a rolling mill control system which uses this data to set the lateral gap of the rolls in stand 11 to establish the aim size of bar 10.

More specifically, light box 30 is located opposite electronic camera head 31 so that when bar 10 intercepts light from box 30 a bar shadow having a width proportional to bar diameter at a lateral position will be imaged on electronic camera head 31. A typical arrangement of a backlighted camera head, is shown in FIG. 3 and described below.

Light box 30 is arranged to produce a light source perpendicular to bar 10 larger than the largest size bar 10 to be gaged in the camera field-of-view. For example, the camera field-of-view referred to below is three inches (7.62 cm.) and the light souce used therewith is four inches (10.16 cm.). In addition, the wavelength and intensity of light box 30 must be compatible with the sensitivity characteristics of electronic camera head 31. Typically, blue light from a D.C. fired fluorescent light source is preferred for the electronic camera head described below.

The shadow of bar 10, together with excess light beyond bar 10 edges directed from back light box 30, causes first electronic camera head 31 to generate a camera signal. This signal consists of a raw camera pulse mixed with noise which is fed over wire 34 to first camera electronics 35. As described below in connection with FIG. 3, the camera signal is processed to remove the noise and produce a digital bar size signal which is fed over cable 36 to computer 27. Gage enable and other signals are fed over cable 37 from computer 27 to camera electronics 35.

Computer 27 in the present electro-optical bar gaging system also receives bar 10 aim size digital signals from thumbwheel selector 42 by way of cable 43. Aim size signals, exemplified as 1.7500 inches (4.445 cm.), are used to determine bar 10 size deviation and other purposes described below. In addition, computer 27 also receives a bar 10 composition digital signal from thumbwheel selector 44 by way of cable 45. Composition signal, which is exemplified as 0.230% and represents percent carbon in the bar 10, is used as a factor in correcting hot bar 10 size for shrinkage and other purposes described below. Further, computer 27 also receives appropriate order data signals, including data, time and size tolerances for bar 10, from source 46 by way of cable 47. Alternatively, any one or all of the aim size signals, composition signals, and other data signals may be supplied by a control system directly associated with rolling bar 10, depending upon the perference of the bar gaging system user.

In order to make temperature corrections to the diameter measurements of moving hot bar 10, a Land Co. optical pyrometer head 48 is provided adjacent scanner 12 and aimed at moving hot bar 10. Optical pyrometer head 48 is adapted to generate a high-response raw temperature signal which is fed over cable 49 to Land Co. pyrometer electronics 50. The raw temperature signal is corrected by scaling and linearizing circuits in pyrometer electronics 50 and the corected temperature signal, exemplified as 1670° F. (910° C.), is fed over cable 51 to digital indicator 52. In addition, the corrected temperature signal is fed over cable 53 to computer 27 where it is used to compensate hot bar 10 for shrinkage.

Installation problems may preclude a Land Co. optical pyrometer head 48 and pyrometer electronics 50 from providing a corrected temperature signal to computer 27 and indicator 52 with desired accuracy and rate of response. If such is the case, an alternative to the Land Co. pyrometer arrangement may be to replace it with an optical field scanning pyrometer system disclosed in cross-reference (A). Briefly, the optical field scanning pyrometer system consists of a rapidly oscillating mirror mounted in a pyrometer head and aimed at a field-of-view through which hot bar 10 will travel. The hot bar is imaged through a slit and onto a high-response infrared detector in the pyrometer head. The infrared detector feeds a peak detector and sample-and-hold circuits to measure and store a nonlinear signal of bar 10 temperature. The stored nonlinear signal may be fed over cable 53 to computer 27 where it must be scaled and/or linearized. The stored temperature signal is updated every scan of the oscillating mirror, for example every 20 ms., by a busy-ready flag pulse fed over dotted-line cable 54. In addition, the stored temperature is scaled and linearized with less frequent up-dating and may be fed to bar temperature indicator 52. Provisions are made for adjusting field scanning frequency and width of field-of-view to suit a variety of installations.

One other feature of the present bar gaging system is an automatic recalibration system. As described below, this feature is initiated each time the trailing end of hot bar 10 is detected leaving mill rolls 11. For this reason, hot metal detector 55 detects the presence and absence of hot bar 10 and feeds a corresponding signal over wire 56 to hot metal detector electronics 57. A presence/absence signal is fed over cable 58 to computer 27 where it initiates the automatic recalibration system mentioned above.

All camera signals, aim size signal, composition signal, other signals, temperature signal and hot metal presence/absence signal fed over respective cables 36, 43, 45, 47, 53 and 58 are assimilated by computer 27 to perform a variety of functions under control of a group of computer off-line and on-line programs detailed below. One of thes function is to feed bar diameter data, and bar correction data from computer 27 over cable 59 to CRT terminal 60, and to accept interaction between a standard keyboard on terminal 60 and computer 27 by way of cable 61.

Another function of computer 27 is to feed bar diameter data, and bar correction data from computer 27 over cable 62 to printing terminal 63, and to accept interactions between a standard keyboard on terminal 63 and computer 27 by way of cable 64. Printing terminal 63 produces printout 65 such as data log or recalibration data. Still another function of computer 27 is to feed bar 10 diameter data over cable 66 to control system 67 in response to corresponding request signals fed back to computer 27 by way of cable 68.

Figure 2:
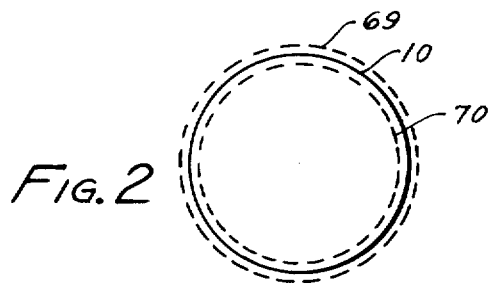
FIG. 2 is a diagram of a bar cross-section showing maximum and minimum tolerance limits in dotted circles.

Turning now to FIG. 2, there is shown a cross-sectional diagram illustrating the lateral profile of bar 10. dotted circular lines 69 and 70 are illustrative of maximum and minimum standard commercial tolerances for aim size diameter. Bar aim size is 1.7500 inches for illustrative purposes.

It should be noted that the display on CRT terminal 60 is substantially the same as computer printout 65. Thus, CRT terminal 60 displays bar diameter data in a form that is unique and quite useful to an operator of the bar gaging system as well as an operator of a rolling mill where the bar gage is used.

ELECTRONIC CAMERA HEAD

A typical back-lighted electronic camera head used in the present electro-optical bar gaging system is shown in FIG. 3 as camera head 31 placed along an optical axis on the opposite side of bar 10 from light box 30. This arrangement illuminates field-of-view 80 and produces bar shadow 81 that varies vertically proportional to the lateral dimension between hot bar edges 82, 83. An end view of hot bar 10 makes it appear stationary but in actual practice bar 10 vibrates in orbit 84 while traveling longitudinally at speeds up to 4000 ft./min. (1219 m./min.). For this reason, hot bar shadow 81 not only varies vertically proportional to bar size, but is also displaced horizontally and vertically within the confines of about a three inch diameter bar orbit 84. This phenomenon requires a larger field-of-view 80 than does a stationary bar, thereby increasing the problems of precision bar measurements.

Because the bar shadow 81 varies vertically and its position varies both horizontally and vertically, camera head 31 is provided with telecentric lens system 85 which is designed to admit only parallel light rays with a focal plane extending from at least the nearest horizontal edge of bar orbit 84 to at least the farthest horizontal edge of bar orbit 84. This is accomplished by seven-element lens 86 having a four-inch field-of-view 80 within which three inch bar orbit 84 is centered vertically. Other properties of lens 86 include an image size reduction of 1:2 and a telecentric lens stop 87 having a very narrow horizontal optical aperture 88 through which bar shadow 81 passes. Transmission of bar shadow 81 is limited by optical filter 89 to pass only blue light from light box 30, thereby eliminating undesirable effects of other light sources in the field-of-view which have different wavelengths.

Accordingly, telecentric lens system 85 produces a horizontally-oriented bar shadow 81 that varies vertically between bar edges 82, 83 and remains sharply in focus while bar 10 vibrates in orbit 84.

Bar shadow 81 transmitted by telecentric lens system 85 is imaged upon image responsive devie 90 which is capable of being scanned at 300 Hz., has a resolving power of at least 1 part in 10,000, and has a high sensitivity to blue light. Preferably, device 90 is an image dissector (I.D.) tube having photocathode electrode 91 with a central image translating area which receives the bar shadow 81 image. Photocathode electrode 91 is located behind a light-transmitting face in the drift section of I.D. tube 90. Photoelectrons emitted by photocathode electrode 91 are focused by external means to pass through electron aperture 92 so they can enter the photomultiplier (P.M.) section of image dissector tube 90. Preferably, device 90 is an ITT CO. high resolution image dissector tube No. F4052RP.

Camera head 31 also includes cylindrical deflection and focus coil assembly 93 surrounding the cylindrical body of image dissector tube 90. Coil assembly 93 includes separate Y-axis and X-axis deflection coils and a focus coil, each energized from separate external sources. Standard mu metal shielding surrounds the exterior cylindrical wall of coil assembly 93, thereby providing effective shielding against radial magnetic fields. A preferred coil assembly 93 designed for use with the above noted I.D. tube 90 is Washburn Laboratory, Inc. No. YF2308CC3C.

Occasionally, the standard mu metal shielding in the Washburn Laboratory, Inc. coil assembly 93 may not provide enough shielding against both radial and axial magnetic field sources. For example, when I.D. tube 90 is operating at a high sensitivity level, electrical equipment generating strong magnetic fields in the vicinity of the gage, may cause I.D. tube 90 output to change. If this condition is encountered in practice, an alternative solution exists which requires modifying the Washburn standard mu metal shielding to improve the attenuation of axial magnetic fields according to the teachings in cross-reference (B). Essentially, this involves extending the standard Washburn cylindrical mu metal shield axially toward lens system 85 and closing down the end at filter 89, except for an optical aperture to image bar shadow 81 onto photocathode electrode 91 in tube 90. Additional axial magnetic field attenuation may be achieved by a second cylindrical mu metal shield surrounding the extended standard shield. Moreover, the standard coil shield may be used without extension, but axial field attenuation may be achieved by adding a second and possibly a third cylindrical mu metal shield extending axially as in the first instance.

Still referring to FIG. 3, the present electrooptical bar gaging system may experience other calibration drift and variations in optical, image dissector tube, and other electronic nonlinearities inherent in the bar gaging system. These drift and variable gaging conditions may be identified by providing on-line calibration checks and subsequently correcting the calibrated bar signals as described below. These calibration checks are made possible by modifying image dissector tube 90 to provide a masked photocathode electrode 91 as shown in FIG. 4.

As can be seen in FIG. 5, masked photocathode electrode 91 includes patterned image non-translating areas adjacent image translating areas. More specifically, calibration masks 94, 95 are made by selectively depositing the usual photoresponsive material of photocathode electrode 91 onto image transmitting glass flace 96 using a precision mask to form the calibration reference patterns. For example, calibration mask 94 may consist of a single 0.250 inch mask centered on the right side of photocathode electrode 91. Calibration mask 94 is referred to as "right mask" and may be used for on-line checking of bar gaging system calibration drift under RTMASK computer program described below. Calibration mask 95 may consist of five 0.100 inch wide masks spaced 0.100 inch apart on the left side of photocathode electrode 91. Calibration mask 95 is referred to as "left mask" and may be used for on-line checking of variations in bar gaging system optical and electronic linearities under LFTMSK computer program described below. FIG. 5 is an enlarged cross-section taken through FIG. 4 to show the right mask 94 void in masked photocathode electron 91, the void extending to glass face 96 of image dissector tube 90.

During all bar gaging system operations a single-axis bidirection sweep signal is applied to the Y-axis deflection coil and a fixed amount of current applied to the focus coil, both as described below. Under normal bar gaging operations, there is no current applied to the X-axis deflection coil. This causes the Y-axis scan to traverse the "C" scan, or central image translating area of photocathode electrode 91 as shown in FIG. 4. Whenever detector 55 determines there is no bar 10 in the camera field-of-viewm computer 27 may select either right or left calibration mask 94, 95 by applying a positive or negative bias current is applied to the X-axis deflection coil. This X-axis bias shifts the Y-axis scan of photocathode electrode 91 to corresponding "R" scan and "L" scan positions on opposite sides of "C" scan as shown in FIG. 4.

The X-axis bias has the effect of shifting the right calibration mask 94, or the left calibration mask 95, over electron aperture 92 in the image dissector tube 90. When the single Y-axis scan voltage is applied to the Y-axis deflection coil, the image of right or left calibration mask 94, 95 is effectively moved up and down across electron aperture 92 in the same manner as actual bar shadow 81 is moved at the "C" scan position.

It should be noted that the raw camera pulse on wire 34 has the same pulse width when either the right or left calibration mask 94, 95 is selected by computer 27 as occurs when a bar shadow 81 having a corresponding size and position is imaged on the central area of photocathode electrode 91. Hence, the masked photocathode electrode 91 affords an effective way of on-line checking of bar gaging system drift as well as changes in optical and electronic nonlinearities.

CAMERA ELECTRONICS

Typical camera electronics used in the present electro-optical bar gaging system is shown in FIG. 3 as camera electronics 35. Details of camera electronics 35 may best be understood by referring to FIGS. 3 and 6 through 12. All electronic components therein are conventional solid-state devices and include TTL logic elements where logic symbols indicate or imply their use.

Figure 6:
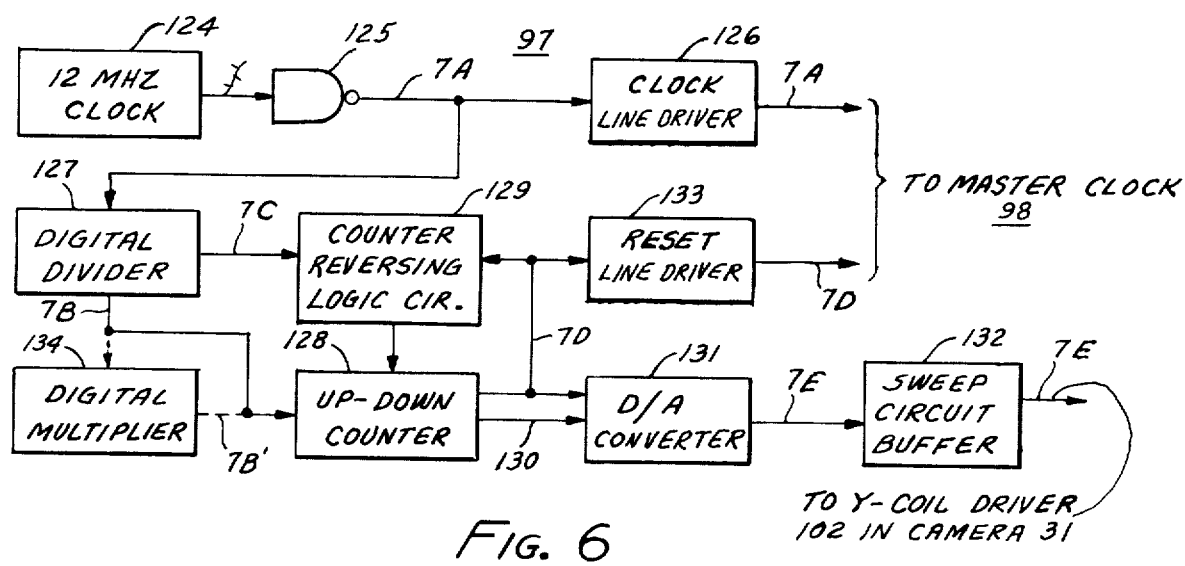
FIG. 6 is a block diagram of a bidirectional sweep generator used in the camera electronics shown in FIG. 3.
Figure 7:
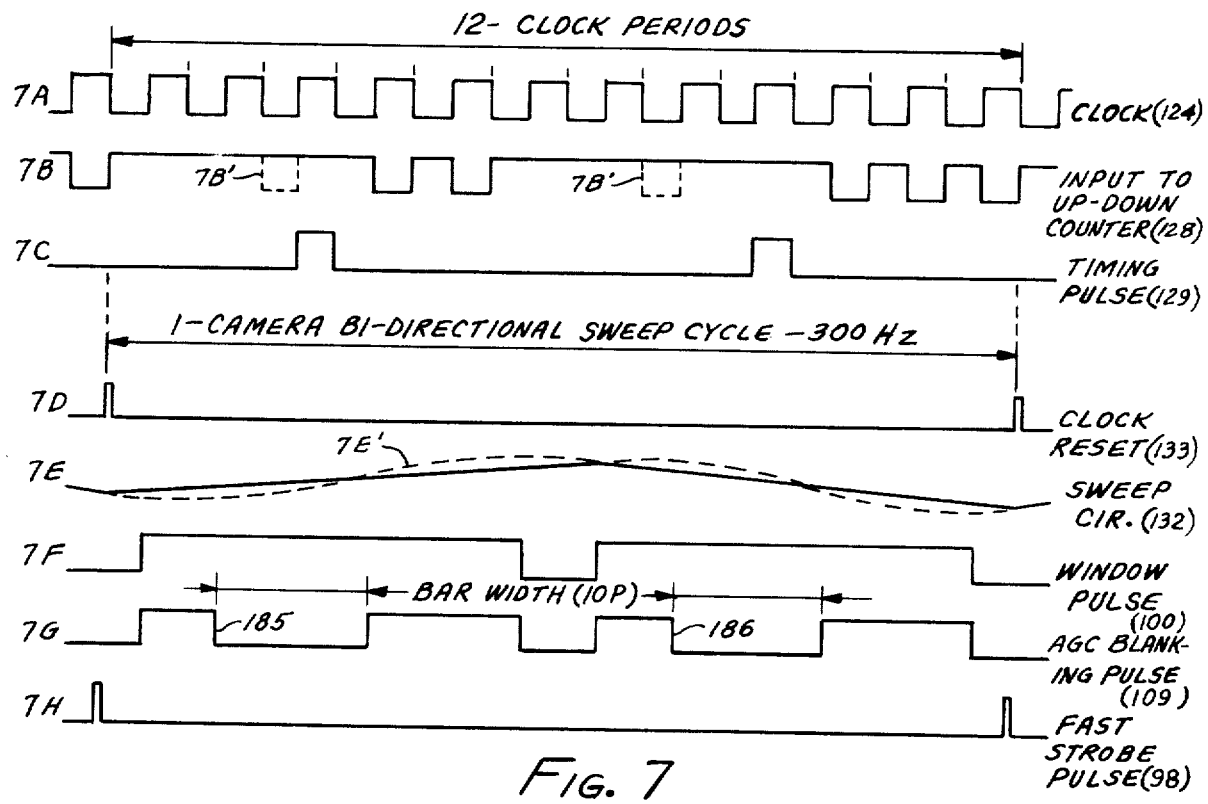
FIG. 7 is a timing diagram of pulses generated by the bidirectional sweep generator, master clock, window pulse generator, and AGC blanking circuits shown in the camera electronics of FIG. 3.

Generally, FIG. 3 shows bidirectional sweep generator 97 which is shown in FIGS. 6 and 7. It includes a 12 MHz. crystal oscillator that provides a train of basic square wave clock pulses 7A for the entire electro-optical bar gaging system. Except for actual measurement of processed bar pulses, all digital operations are synchronized with clock pulse 7A in addition to bidirectional sweep signal 7E and sweep reset pulse 7D, the latter two being generated in sweep circuitry at approximately 300 Hz. Clock pulse 7A and bidirectial sweep signal 7E are synchronized by sweep reset pulse 7D every sweep cycle so that sweep signal 7E may be divided for any purpose by using the appropriate submultiple of clock pulse 7A. Clock pulse 7A is used for actual measurements, while pulses for other bar gaging system requirements are derived by dividing clock pulse 7A down all the way to the frequency of bidirectional sweep signal 7E. It should be noted that the absolute frequency value of clock pulse 7A and bidirectional sweep signal 7E is not critical because the bar gaging system is calibrated by actually placing standard size bars in each camera's field-of-view. However, sweep stability and sweep linearity are highly critical, since they directly affect the bar gaging system accuracy.

Master clock 98 shown in FIG. 3 receives a train of the 12 MHz. clock pulse 7A and the 300 Hz. sweep reset pulses 7D from bidirectional sweep generator 97. Master clock 98 includes buffers, digital counter, divider and logic circuits to supply all synchronized pulses used throughout camera electronics 35 for timing and measuring purposes. These include buffered 12 MHz. clock pulses 7A, buffered 300 Hz. sweep reset pulses 7D. Additional pulses generated within are a 300 Hz. fast stroke pulse 7H of short duration and a data ready pulse similar to pulse 7H but longer in duration. The data ready pulse is outputed on wire 99 and the other pulses carry their same identity to other circuits shown in FIG. 3.

Window generator 100 receives the 12 MHz. clock pulse 7A from master clock 98 and, by means of gates and logic circuitry, generates window pulse 7F once every half of each bidirectional sweep cycle as shown in timing diagram FIG. 7. An inverted window pulse $\overline{7F}$ is also generated. Both window pulses 7F, $\overline{7F}$ are fed to other circuits described below. The width and timing of window pulses 7F, $\overline{7F}$ are determined by a control pulse on wire 101 fed from computer 27. Briefly, the width of window pulses 7F, $\overline{7F}$ is related to the time required for sweep signal 7E to sweep only the photocathode electrode 91, this being only a major portion of each up or down half of an entire 300 Hz. sweep cycle. For example, if the camera field-of-view is three inches and lens is four inches, as they are herein, then the three inch field-of-view is imaged down centrally to cover the entire face of photocathode electrode 91. Over-scanning of photocathode electrode 91 results in each up and down half of bidirectional sweep cycle 7E. This over-scanning is equally divided into two time intervals at the beginning and ending of each up and down half of bidirectional sweep cycle 7E. Thus, the sum of the durations of window pulse 7F (about 75%) and the overscan (about 25%) equal the duration of each up and down half of bidirectional sweep cycle 7E. As an alternative arrangement, window pulse width may be established manually by selective gating means not shown to replace the computer 27 control signal on wire 101.

During computer 27 programs RTMASK, LFTMSK, CALIBR, and GAGRCL described below, window generator 100 is programmed by way of wire 101 to modify the normal size and timing of window pulses 7F, $\overline{7F}$. During RTMASK and GAGRCL, window pulse size and timing are set for the size and location of right calibration mask 94 in FIG. 4. During LFTMSK, five window pulses sized and timed for each size and location of left calibration mask 95 elements are generated one at a time to selectively cover the entire left calibration mask 95. During CALIBR, size and timing of the window pulse are selectively set for right calibration mask 94 and each of the five left calibration masks 95. The normal window used when masks are not being measured is set by subroutine GAGEIN described below.

Still referring to FIG. 3, bidirectional sweep signal 7E is fed from bidirectional sweep generator 97 to Y-coil deflection driver 102 and into the vertical or Y-deflection coil in coil assembly 93. Constant current from focus coil current source 103 is fed to the focus coil in coil assembly 93. The magnitude of focus current is adjusted to focus all electrons emitted from each point on the photocathode surface 91 to a corresponding single point in the plane of the electron aperture 92.

X-coil driver 104 is connected to the horizontal or X-deflection coil in coil assembly 93. Under normal bar gaging operations there is no effective current applied to X-deflection coil. Therefore, the vertical single-scan of the Y-axis may occur as the "C" scan centrally in the image translating area of photocathode electrode 91 as shown in FIG. 4. During calibration checks by computer 27 under programs RTMASK and LFTMSK described below, positive and negative bias is applied alternately by control wires 105 and 106 from computer 27 to X-coil driver 104. This will cause the vertical single scan of the Y-axis to shift to either the "R" scan or "L" scan position corresponding to the right mask 94 or the left mask 95, depending on which bias control wire 105, 106 is energized. As an alternative arrangement, the positive and negative bias currents may be selected manually from a source not shown instead of computer 27 supplying them.

In summarizing the image dissector tube 90 scanning effected by coil assembly 95, only single-scan Y-axis, or vertical, bidirectional scanning is present at any time, this occurring continuously as an up and down sweep with no blanking. Under normal bar gating operations there is no X-axis sweep, there being only a positive or negative bias applied to check gage system calibration when not measuring bar shadow 81.

As bar shadow 81 is scanned over the camera field-of-view, output current from image dissector tube 90 drops sharply as bar shadow 81 is met, then rises again when the bar shadow is past. This current change, together with electrical noise from the mill environment, is converted to voltage, amplified in a preamplifier not shown in FIG. 3 and is the raw camera signal output from camera head 31 and appears on wire 34. That is, the raw camera signal at this point consists of a not too well defined bar pulse mixed with noise.

Image dissector tube 90 in camera head 31, operates in a self-balancing measuring loop 107 together with camera pulse processor 108, photomultiplier (P.M.) AGC circuit 109 which produces a variable control voltage on wire 110, and a voltage-controlled high voltage source 111 for P.M. section of tube 90. The drift section of tube 90 is also fed from a separate but stable drift section high voltage source 112.

Figure 8:
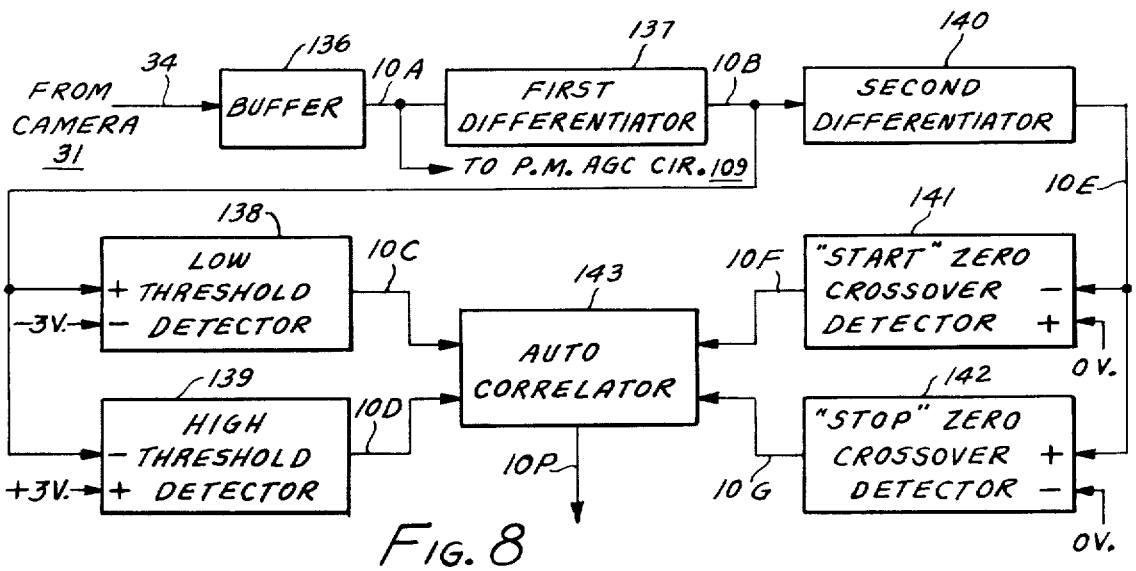
FIG. 8 is a block diagram of the camera pulse processor used in the camera electronics shown in FIG. 3.
Figure 9:
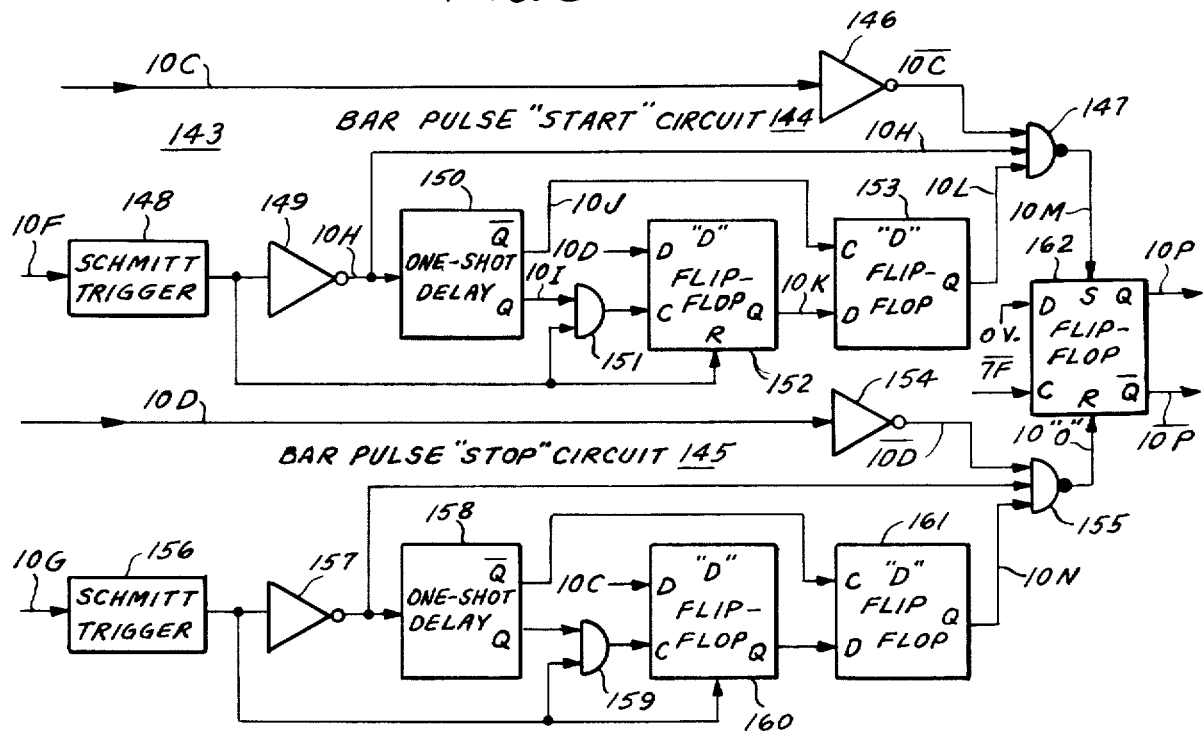
FIG. 9 is a block diagram of an autocorrelator used in the camera pulse processor shown in FIG. 8.
Figure 10:
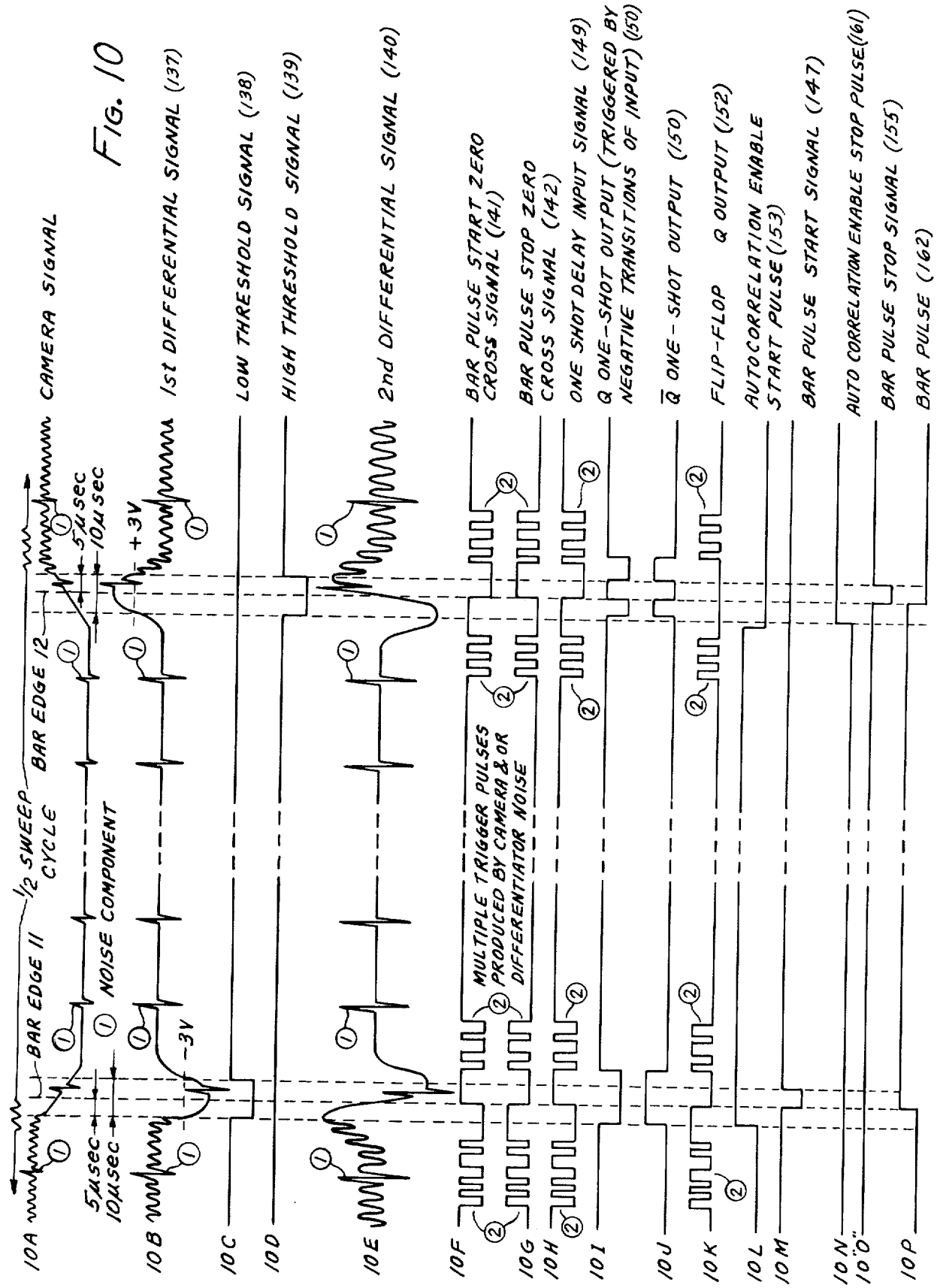
FIG. 10 is a timing diagram of various raw camera signal, differentiator, autocorrelator and bar pulses occurring in the pulse processor shown in FIG. 8.

Camera pulse processor 108 is shown in FIGS. 8 and 9 with FIG. 10 illustrating the processor timing pulses. Included are a buffer, double differentiators, level detectors, zero-crossing detectors and an autocorrelator to remove noise from the raw camera signal and from differentiators. Signals so treated are combined with inverted window pulse $\overline{7F}$ in processor logic to ensure that only bar pulses of proper amplitude and occurring at the correct time, will be passed outward for measurement purposes. This also prevents passage of bar pulses when the window is not open. Camera pulse processor 108 produces a buffered camera signal 10A and precision square wave bar pulses 10P, $\overline{10P}$ generated by an internal flip-flop. Bar pulse width varies proportional to bar shadow 81 and therefore proportional to bar dimension between bar edges 82 and 83.

Figure 11:
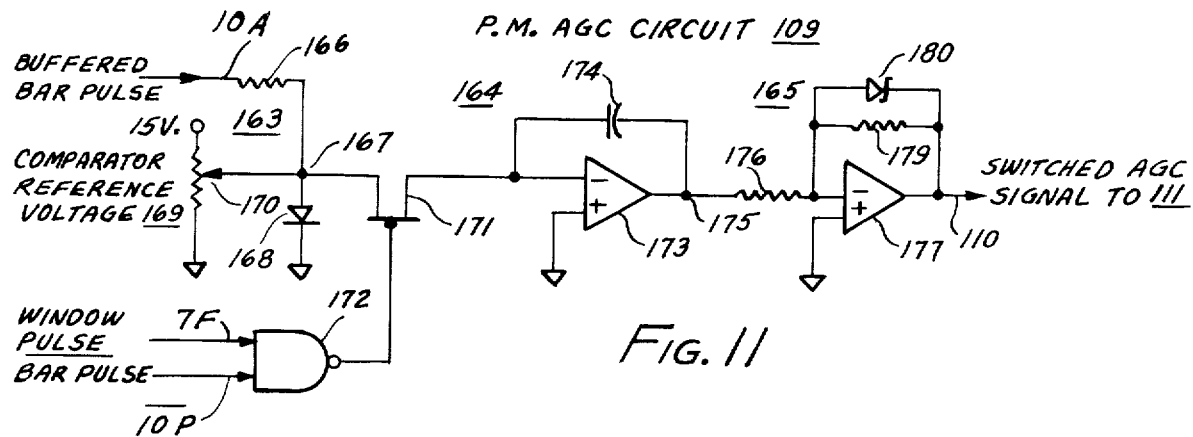
FIG. 11 is a circuit diagram of a P.M. AGC circuit shown in a camera self-balancing measuring loop incorporated in the camera electronics shown in FIG. 3.

P.M. AGC circuit 109, which is shown in FIG. 11 and described below, receives buffered camera signal 10A and includes a comparator, a switched-integrator and an amplifier for producing a switched variable control voltage on wire 110. This control voltage is fed to P.M. section high voltage source 111 for the purpose of varying the gain of image dissector tube 90. The comparator establishes a reference gain level and an internal logic circuit generates an AGC blanking pulse 7G by combining window pulse 7F with inverted bar pulse $\overline{10P}$. The AGC blanking pulse effectively defines the time intervals when the camera signal should be sampled.

Action of the self-balancing measuring loop 107 will now be described. When there is no bar 10 in the gaging system, only light from box 30 is imaged on photocathode electrode 91. This causes the P.M. section in image dissector tube 90 to generate a current to flow on wire 34 which is proportional to the intensity of light from box 30. The gain of P.M. section in tube 90 is adjusted to a high level initially by the effective level of AGC control voltage produced by circuit 109. As light intensity deteriorates, or the image dissector tube 90 ages, AGC circuit 109 automatically compensates for this by adjusting the level of P.M. section high voltage from source 111 to vary the constant gain of the P.M. section of tube 90 and thereby maintain a constant amplitude of the camera signal.

When bar 10 is imposed in the path of light from box 30, AGC circuit 109 also functions to maintain a constant signal amplitude in the output from image dissector tube 90. Self-balancing measuring loop 107 thereby permits operation of image dissector tube 90 at a high sensitivity level while maintaining a reasonably high signal-to-noise ratio which is desirable for effective raw camera pulse processing.

Still referring to FIG. 3, precision bar pulses 10P, clock pulses 7A, clock reset pulses 7D and fast strobe pulses 7H are fed to display timing 113. Logic circuits therein are arranged to count clock pulses 7A for the duration of each of two bar pulses 10P occurring during a bidirectional sweep cycle, then dividing by two. Counting is synchronized by clock reset pulse 7D which occurs at the bottom of each bidirectional sweep signal 7E. Logic circuits are strobed by fast strobe pulse 7H in preparation for a binary bar size signal being outputed on wire 114 for display purposes. In order to avoid display flicker, the binary bar size signals are averaged over a predetermined number of bidirectional sweeps, such as 4, 32, 512 sweeps, by means not shown.

Binary bar size signals are fed over wire 114 to digital indicator 115. This device includes integrated counter-decoder-display modules calibrated to display in decimal digits the uncorrected size of bar 10. The term uncorrected bar size is applied to bar dimensions at this part of the bar gaging system because no correction for electronic drift, bar temperature and bar composition has been made.

Computer 27 does make corrections to the uncorrected bar size signals and feeds a corrected binary bar size signal over wire 116 to corrected bar size digital indicator 117. This digital indicator is structured the same as digital indicator 115. Both bar size indicators 115, 117 have visual displays adapted to be synchronized and updated every 512 sweep under control of clock reset pulses 7D and fast strobe pulses 7H. It is to be noted that the difference between readings on bar size indicators 115, 117 signifies to a bar gage operator, and to a rolling mill operator, that (a) the correction features of the bar gaging system are working as required, and (b) that the rolling mill is rolling aim size product.

Bar size digital data to be transferred to the computer is generated independent of the uncorrected bar size display circuit 115. To do this, bar pulses 10P, clock pulses 74, clock reset pulses 7D and fast strobe pulses are fed to bar size accumulator 118 which is illustrated in block diagram FIG. 12 and the timing of pulses is shown in FIG. 7. Counter and latch circuits, under control of control gate 180, provide binary bar size output signals on wire 119. The binary bar size signals on wire 119 are developed similarly to the uncorrected bar size signals associated with display timing circuits 113 described above.

Transfer of all data between the computer 27 and other parts of the bar gaging system is carried out by gage-computer data transfer logic circuit 121. Logic circuit 121 receives a command signal over wire 122 which is indicative of computer 27 being of such state as to permit data transfer. Command signal 122 is logically combined with the "data ready" pulse on wire 99, which is generated by master clock 98 as described above. Their combined presence causes logic circuit 121 to generate a ▸request to send" signal on wire 123 and synchronize the timing of the gaging system with computer 27.

BIDIRECTIONAL SWEEP GENERATOR

Reference will now to made to bidirectional sweep generator 97 shown in FIG. 6 block diagram and FIG. 7 timing diagram. In order to make bar size measurements to a system accuracy of quarter commercial tolerance inch in a three inch field-of-view, the bidirectional sweep of the Y-axis in image dissector tube 90 must be extremely linear and repeatable. Conventional analog sweep circuits are generally difficult to design and maintain to the level of linearity required herein. But if a sacrifice in system accuracy is acceptable for some gaging systems, then analog sweep circuits may be considered. However, to meet the high accuracy requirements of the present gaging system, the bidirectional sweep of the Y-axis is generated by digital means with a crystal oscillator for a time base, digital counters, and a fourteen-bit digital-to-analog converter that develops the actual bidirectional sweep waveform 7E. Digital provisions are made to modify sweep waveform 7E as described below.

The time base provided is a highly stable 12 MHz. crystal clock oscillator 124 having a square wave output. Buffer 125 prevents nonuniform loading of time base 124 during sweep operations and feeds a train of clock pulses 7A to differential line driver 126. Output from driver 126 is fed as clock pulse 7A to master clock 98 in camera electronics 35. Buffer 125 output also feeds clock pulses 7A to digital divider 127 which has counting and logic devices that generate waveforms 7B and 7C. Waveform 7B is an input to up-down counter 128, a 14-bit binary reversing counter. Waveform 7B is 5/12 of the basic clock frequency, or 5 MHz. Waveform 7C is a timing pulse fed to counter reversing logic circuit 129 and occurs twice in a 12 clock cycle period. Waveform 7B uses five pulse locations in a period of 12 clock cycles and waveform 7C uses two locations. This leaves five unused pulse locations of the 12 clock cycles in the bidirectional sweep period.

When the counter reversing logic 129 senses that up-down counter 127 has reached a full count of all 1's, it gates a count-down enable signal back to counter 128. The timing of the count-down enable occurs at the first timing pulse 7C after the full count is reached. When counter 128 senses the count-down enable signal, it begins down counting on the next clock pulse 7B.

When the counter reversing logic circuit 129 senses all 0's in the counter 128, it generates a count-up enable signal on the next occurrence of timing pulse 7C. Counter 128 will begin counting up on the next block pulse 7B.

Up-down counter 128 has a 14-bit binary output which is fed over wire 130 to 14-bit binary digital-to-analog converter 131. Digital-to-analog (D/A) converter 131 tracks counter 128 and produces an extremely linear analog bidirectional sweep signal 7E. This signal is buffered in sweep circuit buffer 132, to prevent overloading of D/A converter 131, and then fed as sweep signal 7E to Y-coil driver 102 in camera electronics 35.

When up-down counter 128 reaches the last down bit, it generates reset pulse 7D which resets logic circuit 129 and D/A converter 131. Differential line driver 133 feeds the reset pulse 7D to master clock 98 in camera electronics 35.

As mentioned above, there are five unused pulse locations in a period of 12 clock cycles. These may be used to provide an accurate nonlinear modification to the extremely linear sweep signal 7E by incorporating digital multiplier 134 in series between digital divider 127 and up-down counter 128 as shown by dotted lines in FIG. 6. Digital multiplier 134 will receive waveform 7B instead of up-down counter 128 and by means of a suitable multiplier generate modified waveform 7B'. Up-down counter 128 will receive modified waveform 7B' and, together with the timing pulse 7C influence on the command signal, will alter the total up-count or total down-count depending on the specific value of the multiplier. This modification will still produce a triangle sweep with slightly curved sides as indicated by modified sweep signal 7E'.

The multiplier for digital multiplier 134 is fed over wire 135 and may originate at computer 27. Alternatively, the digital multiplier may be set by manual means not shown. Regardless of its source the multiplier may be used to make sweep corrections for overcoming optical and/or electronic errors for which no other correction provisions have been made herein.

CAMERA PULSE PROCESSOR

The camera pulse processor 108 is shown in 8, 9 block diagrams and FIG. 10 timing diagram. Camera pulse processor 108 converts the raw camera pulse on lead 34 into a precise bar output pulse on lead 10P that has a width with well-defined edges that accurately represents the dimensional relationship between bar edges 82 and 83. Because of the differentiator, autocorrelator and other design features described below, camera pulse processor 108 is very well suited to process the raw camera pulses at the camera scanning rate of up to about 300 Hz., yet eliminate the effects of camera signal and differentiator noises.

Turning now to FIG. 8, camera pulse processor 108 is shown in block diagram form where alpha designations refer to FIG. 10 waveforms. The raw camera signal from lead 34 is buffered and amplified by buffer 136 to produce signal 19A. The 10A signal is differentiated by first differentiator 137 which has an output 10B. The first differential signal 10B is fed to low and high threshold detectors 138, 139 which have respective outputs 10C and 10D. Threshold detectors 138, 139 produce output signals when their plus (+) input has a lower voltage than their minus (−) input.

The first differentiated signal 10B is differentiated again in second differentiator 140 to produce output 10E. The second differentiated signal 10E is fed to start and stop zero cross-over detectors 141, 142. These detectors are set up to trigger on positive and negative zero crossing transitions greater than 1 mv., thereby producing bar pulse start zero and stop zero outputs 10F and 10G, respectively. The bar pulse start zero and stop zero outputs 10F and 10G, together with low and high threshold signals 10C and 10D, are fed to fixed-delay autocorrelator 143. Bar pulse start zero and stop zero signals 10F and 10G are processed internally in respective autocorrelator circuits as will be described below. Low and high threshold signals 10C and 10D define narrow windows during which the bar pulse start and stop signals 10M and 10"0" are triggered, thereby establishing precise timing for the leading and trailing edges of bar output pulse 10P.

As mentioned above, electronic camera 31 signal on lead 34 may also contain electrical noise. This may be high frequency, low amplitude noise which is frequently coupled magnetically into the electronic camera signal from high-current, SCR-fired, mill drive motor controllers located near electronic camera 31. Without fixed-delay autocorrelator 143, this noise will cause false triggering of bar output pulse 10P. For example, when a transition of camera signal 10A produces a first differentiated voltage 10B lower than a −3 volt threshold of detector 138, a low threshold signal 10C would be enabled which will allow start zero crossing detector 141 to generate a bar output pulse start trigger signal. Since the gain of differentiators 137 and 140 increases with input frequency, a low-amplitude, high-frequency noise spike may produce a first differentiator 137 output signal 10B lower than the −3 volt threshold of detector 138. This is precisely what will happen in rolling mill environments without enhancement of bar pulse generating circuitry.

For this reason, the fixed-delay autocorrelator 143 included in raw camera pulse processor 108 actually includes separate autocorrelator bar pulse start and stop circuits 144 and 145, respectively, as shown in FIG. 9. Bar pulse start and stop circuits 144 and 145 are provided to discriminate between second differentiated signals 10E generated by high frequency noise from those generated by valid bar pulse signals. During the falling edge of camera signal 10A, the second differentiated signal 10E rises to a positive voltage for about 10 microseconds before swinging to a negative voltage. For illustrative reasons, this detail is not shown to scale in FIG. 10 signal 10E waveform. Zero crossing detection of the second differentiated signal 10E by detectors 141 and 142 is the trigger point for the start and stop bar pulses of signals 10M and 10"0", thereby establishing the leading and trailing edges of bar output pulse 10P.

Autocorrelator bar start and stop circuits 144 and 145 take advantage of the respective 10 microsecond rise and fall period of second differentiated signal 10E. This is done by generating autocorrelator enable start and stop signals 10L and 10N as described below. Autocorrelator start enable signal 10L is generated when second differentiated signal 10E is continuously positive for at least one-half of this 10 microsecond period before swinging negative. Similarly, autocorrelator stop enable signal 10N is generated when second differentiated signal 10E is continuously negative for at least one-half of the 10 microsecond period before swinging positive.

Autocorrelator start and stop enable signals 10L and 10N are logically "anded" in circuits 144 and 145 with respective low threshold signals 10C and 10D and bar pulse start and stop zero crossing signals 10F and 10G to generate bar pulse start and stop signals 10M and 10"0". These signals cause the precise generation of bar output pulse 10P. It will now be apparent that high frequency noise which causes respective positive and negative excursions of the second differentiated signal 10E of less than 5 microseconds duration will not generate autocorrelator enable start and stop signals 10L and 10N, thus preventing triggering of bar output pulse 10P.

Still referring to FIG. 9, operation of autocorrelator bar pulse start circuit 144 will now be described. Operation of autocorrelator bar pulse stop circuit 145 is identical to circuit 144 with the exception that it responds to a second differentiated signal 10E which is continuously negative for 10 microseconds before swinging positive. Both circuits 144 and 145 employ conventional logic devices.

Low threshold signal 10C is inverted in amplifier 146 and fed to one of three inputs of NAND gate 147, the latter providing the bar pulse start signal 10M under proper logic conditions.

Bar pulse start zero crossing signal 10F is conditioned in Schmitt trigger 148 and inverted in amplifier 149, thereby producing trigger signal 10H which is fed to NAND gate 147 and one-shot delay device 150. A negative going transitionn of signal 10H triggers one-shot delay device 150 which produces a 5 microsecond logic "1" pulse 10I at Q output, and a 5 microsecond logic "0" pulse 10J at $\overline{Q}$ output. Pulse 10I is fed to one of two inputs to AND gate 151. Schmitt trigger 148 output is also fed to the other input of AND gate 151 as well as to the reset input of flip-flop device 152. Pulse 10J is fed to the clock input of flip-flop device 153. The high threshold signal 10D is wired to the data input of flip-flop 152 to enable the autocorrelator start circuit 144 during the falling edge of camera signal 10A and disable this circuit during the rising edge of signal 10A.

If signal 10H is going negative, the input to inverter 149 to going positive. This positive going action removes the reset condition on flip-flop 152 and puts a logic "1" on one input of AND gate 151. Gate 151 will now pass pulse 10I to the clock input of flip-flop 152, thus forcing a logic "1" pulse 10K at Q output. After a 5 microsecond delay, one-shot delay 150 will time out, thereby causing output $\overline{Q}$ to change state and go to a logic "1" pulse 10J. This action also clocks the input of flip-flop device 153 which has its data input fed by signal 10K from the Q output flip-flop device 152.

If signal 10K is a logic "1", flip-flop 153 output Q will be set, thereby producing start enable signal 10L. Signal 10L, which was generated from signal 10H, is logically combined with signals 10H and $\overline{10C}$, the inverted low threshold signal, in NAND gate 147 to produce the bar pulse start signal 10M. Thus, it will now be readily recognizable that a bar pulse signal is delayed, then combined with itself to perform a fixed-delay autocorrelation function.

If during the 5 microsecond period controlled by one-shot delay device 150, the output of Schmitt trigger 148 goes low, indicating that the second differentiated signal 10E is too narrow to be a valid bar signal, the reset of flip-flop 152 goes low and forces signal 10K to a logic "0". When one-shot delay device 150 times out after 5 microseconds, signal 10J will clock flip-flop 153 with its data input in a low state. This will force the Q output of flip-flop 153 to a logic "0" and prevents any further processing of the bar signal.

One-shot delay device 150 is retriggerable so that it may accommodate consecutive triggering pulses 10H. If multiple trigger pulses having a short duration of less than 5 microseconds trigger one-shot delay device 150, Q output signal 10I will stay high for all pulses and finally timeout 5 microseconds after the last triggering pulse. AND gate 151 allows flip-flop 152 to re-clock itself on each pulse. Since the output of one-shot delay device 150 stays high continuously during these multiple triggering pulses, the combining of signal 10I with the Schmitt triggering pulse in AND gate 151 guarantees that the clock line on flip-flop 152 will undergo a logic transition from "0" to "1" for each triggering pulse.

As noted above, the bar pulse stop circuit 145 was identical with circuit 144, the exception being that stop circuit 145 is triggered by a continuous negative going second differentiated signal 10E before swing positive. For this reason, it will be apparent to those skilled in the art that inverter 154, NAND gate 155, Schmitt trigger 156, inverter 157, one-shot delay 158, AND gate 159, flip-flop 160, and flip-flop 161 devices have construction and operating features the same as their counterpart in circuit 144. Therefore, it is felt an explanation of these devices is unnecessary to show how NAND gate 155 produces the bar pulse stop signal 10"0".

Having eliminated both the electrical noise in the raw camera bar pulse signal and the noise produced by differentiators 137 and 140, the bar pulse start and stop signals 10M and 10"0 " produced in respective circuits 144 and 145 now precisely define the timing of bar pulse leading and trailing edges in relation to bar edges 82 and 83. Therefore, signals 10M and 10"0" are fed respectively to the set and reset inputs of flip-flop device 162. An inverted window pulse 7F shown in FIG. 7 and fed from window generator 100 is fed to the clock input of flip-flop device 162. The data input of flip-flop 162 is tied to 0 volts. This will enable device 162 to produce the bar output pulse only during the presence of a window pulse 7F. The width and timing of the window pulse is different for bar gaging operations than in calibration checking operations as explained above.

During bar gaging operations the Q output of device 162 provides a precise bar output pulse 10P whose leading and trailing edges are free of noise and accurately define the lateral dimension of bar 10. During calibration checking operations where computer 27 selects RTMASK or LFTMSK programs, bar pulse 10P will accurately define right and left mask 94 and 95 dimensions.

P.M. AGC CIRCUIT

The AGC circuit 109 for the photomultiplier (P.M.) section of image dissector tube 90 is shown in FIG. 11. P.M. AGC circuit 109, which is an essential portion of self-balancing measuring loop 107, includes comparator 163, switched integrator 164 and driver amplifier 165. Amplifier 165 drives P.M. section high voltage source 111 with a switched variable control voltage by way of wire 110. The switched variable control voltage acts as an automatic gain control for tube 90. This is done by varying P.M. section high voltage source 111 to maintain anode current in tube 90 at a constant reference value between bar measurements.

Buffered camera signal 10A is applied to one input of comparator 163 through summing resistor 166 to summing junction 167. Summing junction 167 is limited to positive-going inputs by diode 168. A comparator reference voltage from source 169 is adjusted at potentiometer slider 170 for the purpose of offsetting the bar pulse and establishing a nominal value of the switched control signal that will ultimately set high voltage source 111 at a nominal gain-producing value.

The buffered and offset camera signal at summing junction 167 is to electronic switch 171 in switched integrator 164. The window pulse 7F and the inverted bar pulse $\overline{10P}$ are logically combined in AND gate 172 to produce AGC blanking pulse 7G shown in FIG. 7. When a window pulse is present and a bar pulse is absent, the AGC blanking pulse 7G causes electronic switch 171 to conduct current to integrator amplifier 173 and to charge integrating capacitor 174. When both window pulse 7F and bar pulse 10P are present, electronic switch 171 opens and allows integrator output at junction 175 to maintain the nominal value input to driver amplifier 165.

Driver amplifier 165 consists of summing resistor 176 connected at one end to integrator output junction 175 and the other end to the input of operational amplifier 177. Feedback resistor 178 controls the gain of driver amplifier 165. Zener diode 179 limits the gain of driver amplifier 165 so as not to produce too high a switched control voltage on wire 110 that would overdrive high voltage power supply 111. In summary, when an AGC blanking pulse 7G absent, the buffered bar pulse 7A is conducted through AGC circuit 109 and varies the P.M. section high voltage supply 111. During the presence of an AGC blanking pulse 7A is inhibited and the output of P.M. AGC circuit 109 maintained at a constant reference value determined by the charge on capacitor 174 in integrator 164.

BAR SIZE ACCUMULATOR

Figure 12:
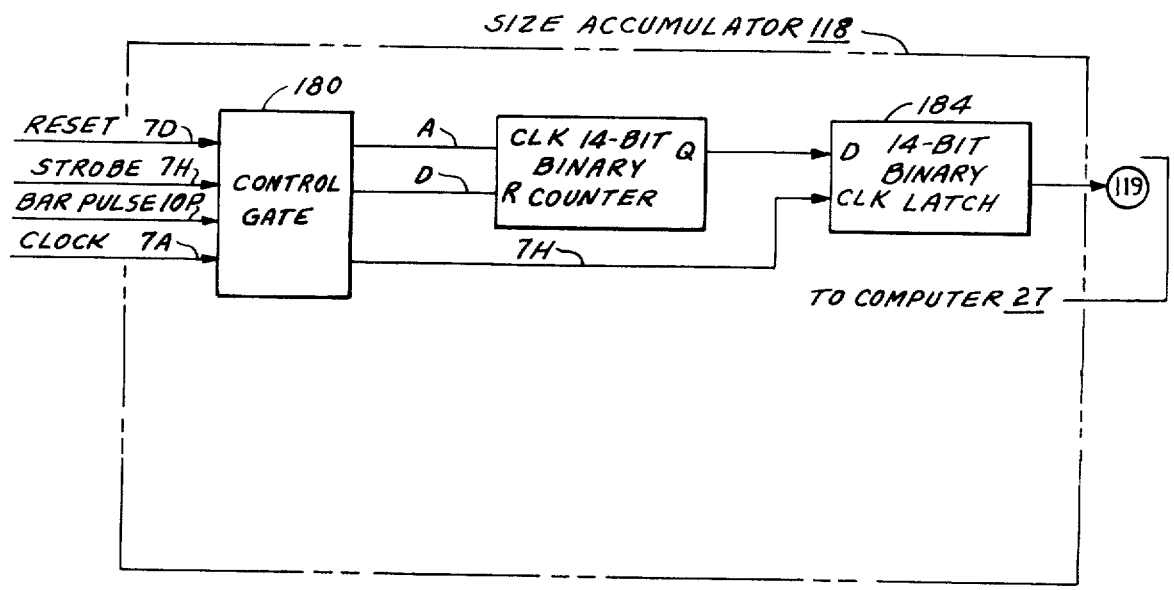
FIG. 12 is a block diagram of a bar size accumulator used in the camera electronics shown in FIG. 3.

The size accumulator 118 is shown in FIG. 12 with reference being made to FIGS. 7, 10 timing diagrams. In the present bar gaging system, uncorrected digital bar size data fed to computer 27 is developed similar to, but separately and independently from, uncorrected digital bar size data displayed on indicator 115. Accumulator 118 is provided with control gate 180 which assimilates bar pulse 10P, clock pulse 7A, clock reset pulse 7D and fast strobe pulse 7H. Circuit 118 is synchronized by clock reset pulse 7D and is strobed by fast strobe pulse 7H every complete sweep cycle.

Control gate 180 detects the leading and trailing edges of each bar pulse 10P and divides by two the number of clock pulses 7A occurring during the two bar pulses present during the up and down halves of the sweep cycle. Control gate 180 directs these clock pulses to the clock input of 14-bit binary counter 183 where a count of two bar pulses divided by two is registered. At the end of a first sweep cycle this size pulse count in counter 183 is transferred into the data input of 14-bit binary latch 184, presuming a previous application of the fast strobe pulse 7H has been applied to the latch's clock input. At the beginning of the second cycle, counter 183 is cleared by clock reset pulse 7D and is ready to receive a new pulse count.

Fourteen-bit digital data, representing uncorrected bar size between bar edges 82 and 83, from the first sweep cycle is stored in latch 184 for a second sweep cycle. During the second sweep cucle this data is transferred over cable 119 to computer 27. At the end of the second sweep cycle, counter 183 data is strobed into latch 184 by pulse 7H, thus repeating the cycle. The counting of bar size pulses is always one sweep ahead of the latched bar size data.

COMPUTER

Figure 13:
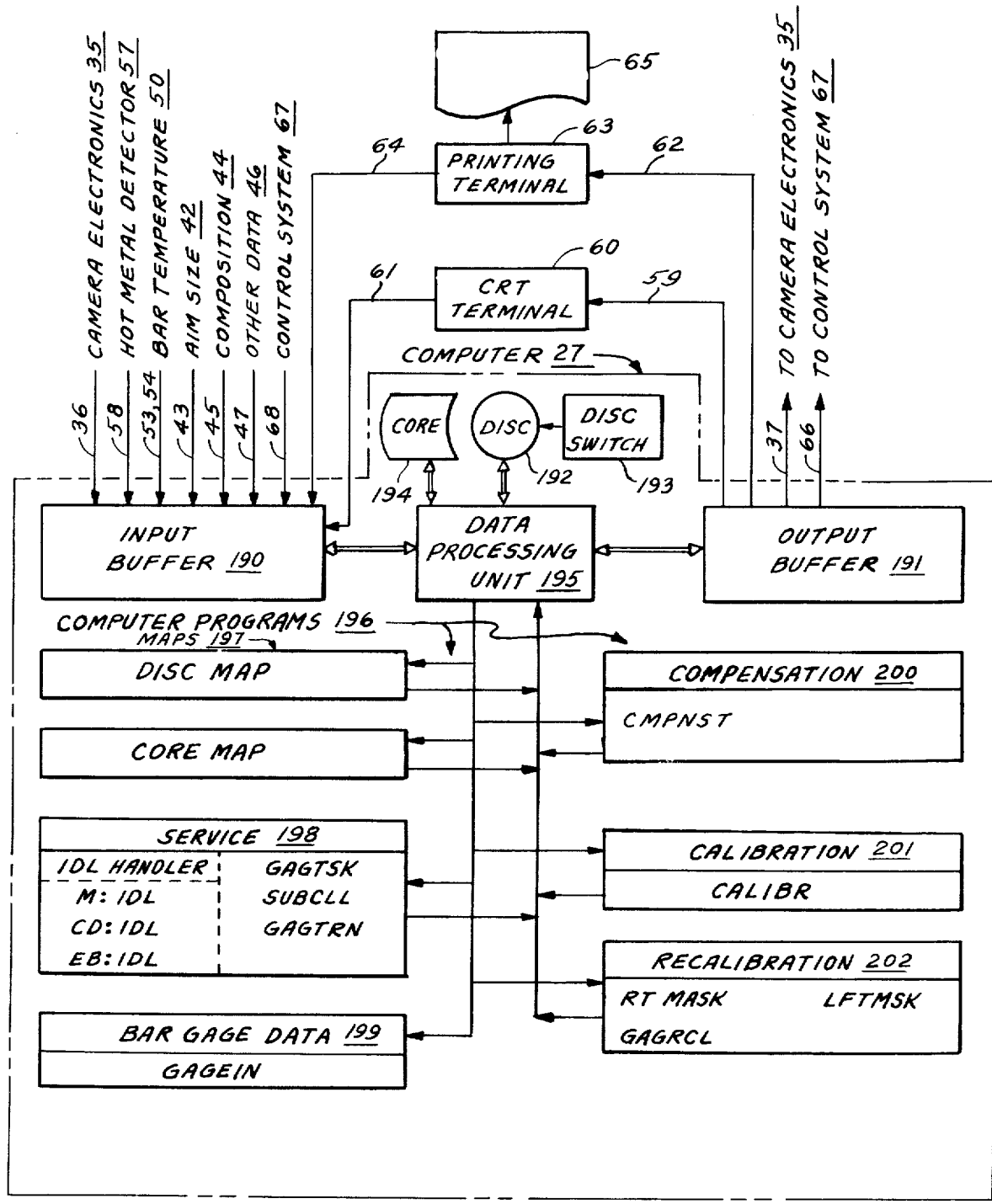
FIG. 13 is a block diagram of the computer shown in FIG. 1 and includes references to computer flow charts and printouts shown in FIGS. 14 to 27.

A block diagram of the electro-optical bar gaging system computer 27 is illustrated in FIG. 13. Computer 27 is a digital system programmed to perform the various functions described below. A commercially available minicomputer may be used, or if desired, computer 27 may be shared in overall rolling mill control computer installation. Computer 27 is exemplified herein as a Westinghouse Electric Co. model W-2500 with an operating system for accommodating various levels of tasks as noted below:

Computer 27 is provided with conventional main components including input buffer 190, output buffer 191, disc storage 192, disc switches 193, core storage 194, all communicating by various channels with data processing unit 195. Computer 27 operations are controlled sequentially according to off-line and on-line computer programs 196. These comprise: computer maps 197, service programs 198, bar gage data program 199, compensation program 200, calibration program 201, recalibration program 202, all covered in FIGS. 14-27 described below.

All communications with the bar gaging system computer 27 from external sources are by way of input buffer 190 which includes means for converting input digital and analog signals to digital form. These include signals fed by wires or cables into the computer as follows: camera electronics 35 on cable 36; hot metal detector 57 on wire 58; bar temperature 50 on cables 53, 54; bar aim size 42 on wire 43; bar composition 44 on wire 45; other data 46 on cable 47; control system 67 on cable 68; CRT terminal 60 on cable 61; and printing terminal 63 on cable 64.

All communications with bar gaging system computer 27 to external sources are by way of output buffer 191 which also includes means for converting output signals to digital and analog form. These include signals fed by wires or cables from the computer as follows: control system 67 on cable 66; and camera electronics 35 on cable 37.

Individual wires in signal cables have been used through the drawings and these have been cabled according to their source and function as described above.

CRT terminal 60 includes a keyboard for operator interaction with computer 27.

Printing terminal 63 includes a keyboard for operator interaction with computer 27. Terminal 63 computer printout 65 includes a display of corrected bar diameter deviation, as well as tubular data in various figures listed below.

Generally, it is permissible for both terminals 60 and 63 to display the same data. All interactions from either keyboard are by way of program mnemonics listed, for example, in FIG. 20B.

Disc switches 193 include switches designated "switch 10" and "switch 12" in the program below. These switches must be turned to "Write Enable" to update programs or data on the disc.

COMPUTER PROGRAMS

The following table lists flow charts of individual and groups of programs associated with computer programs 196 used herein.

| FIG. No. | FLOW CHART IDENTIFICATION | USED OFF-LINE | USED ON-LINE |
|---|---|---|---|
| | MAPS (197) | | |
| 14 | DISC MAP | X | |
| 15 | CORE MAP | X | X |
| | SERVICE PROGRAMS (198) | | |
| | IDL HANDLER | | |
| 16A-E | M:IDL | X | X |
| 18 | EB:IDL | X | X |
| 19A,B | GAGTSK | X | |
| 20A,B | SUBCLL | X | |
| 21 | GAGTRN | X | |
| | BAR GAGE DATA PROGRAM (199) | | |
| 22A-B | GAGEIN | X | X |
| | COMPENSATION PROGRAM (200) | | |
| 23 | CMPNST | X | X |
| | CALIBRATION PROGRAM (201) | | |
| 24A-F | CALIBR | X | |
| | RECALIBRATION PROGRAMS (202 | | |
| 25A-D | RTMASK | X | |
| 26A-C | GAGRCL | | X |
| 27A-E | LFTMSK | X | |

MAPS (197)

Figure 14:
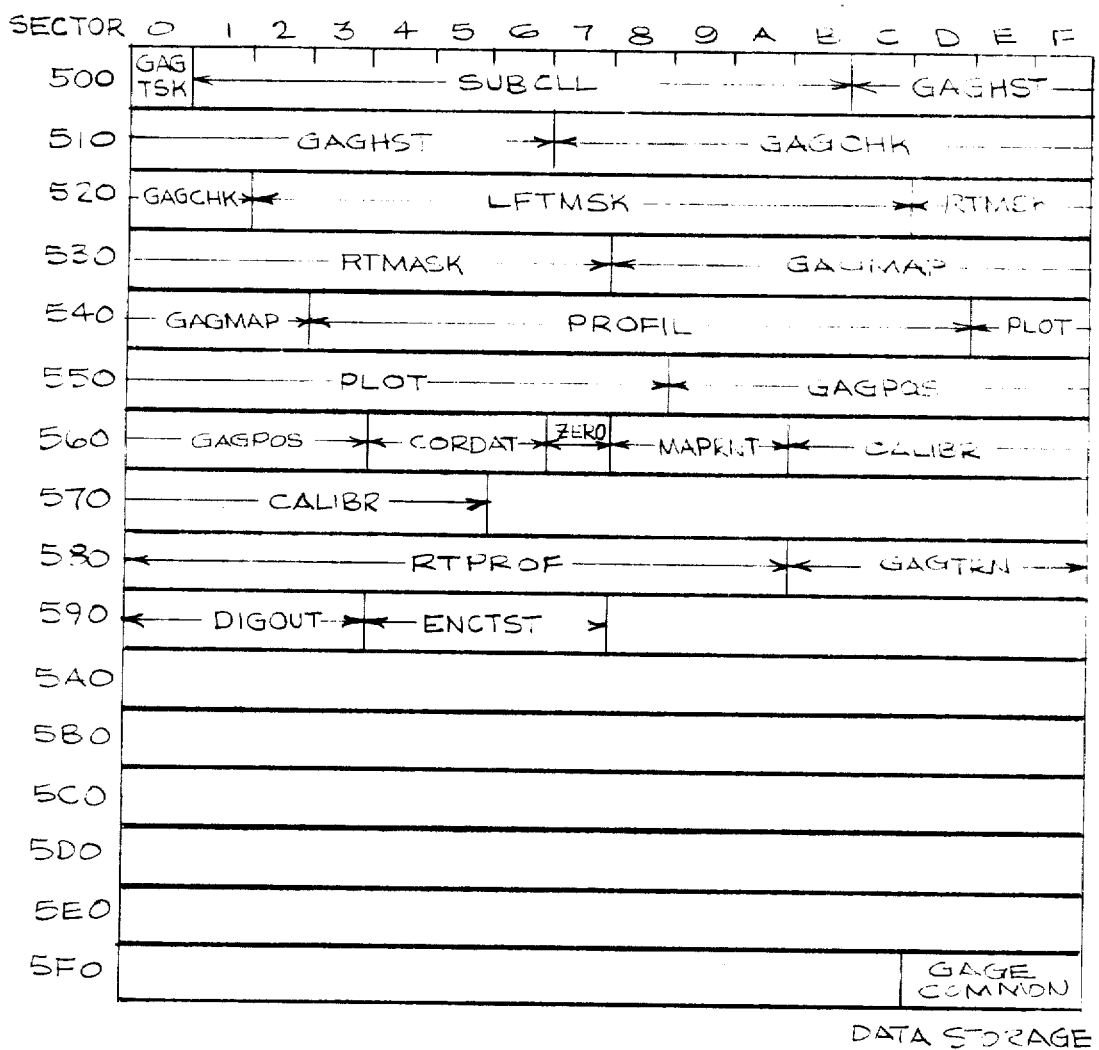
FIG. 14 is a computer DISC MAP.
Figure 16A:
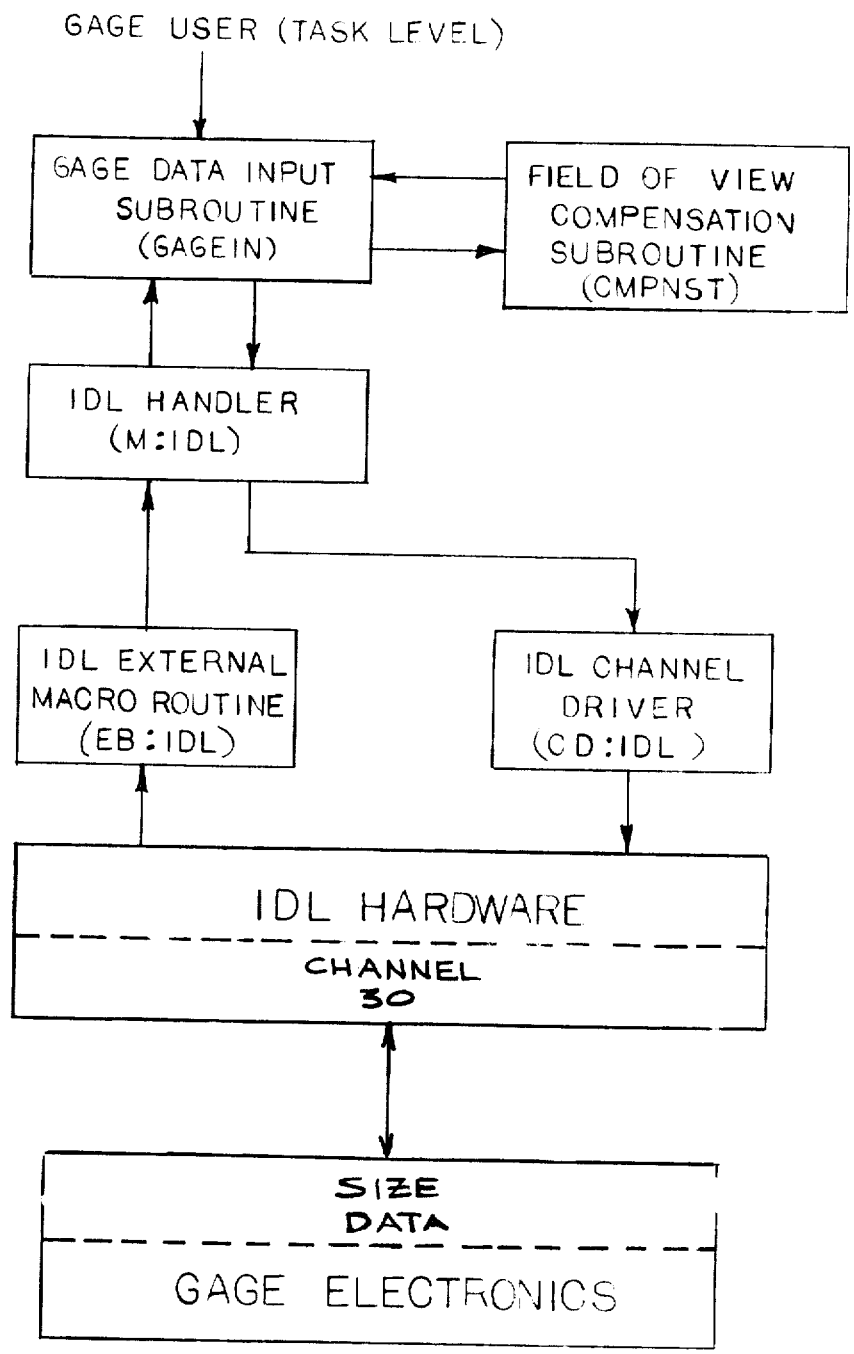
Figure 16B:
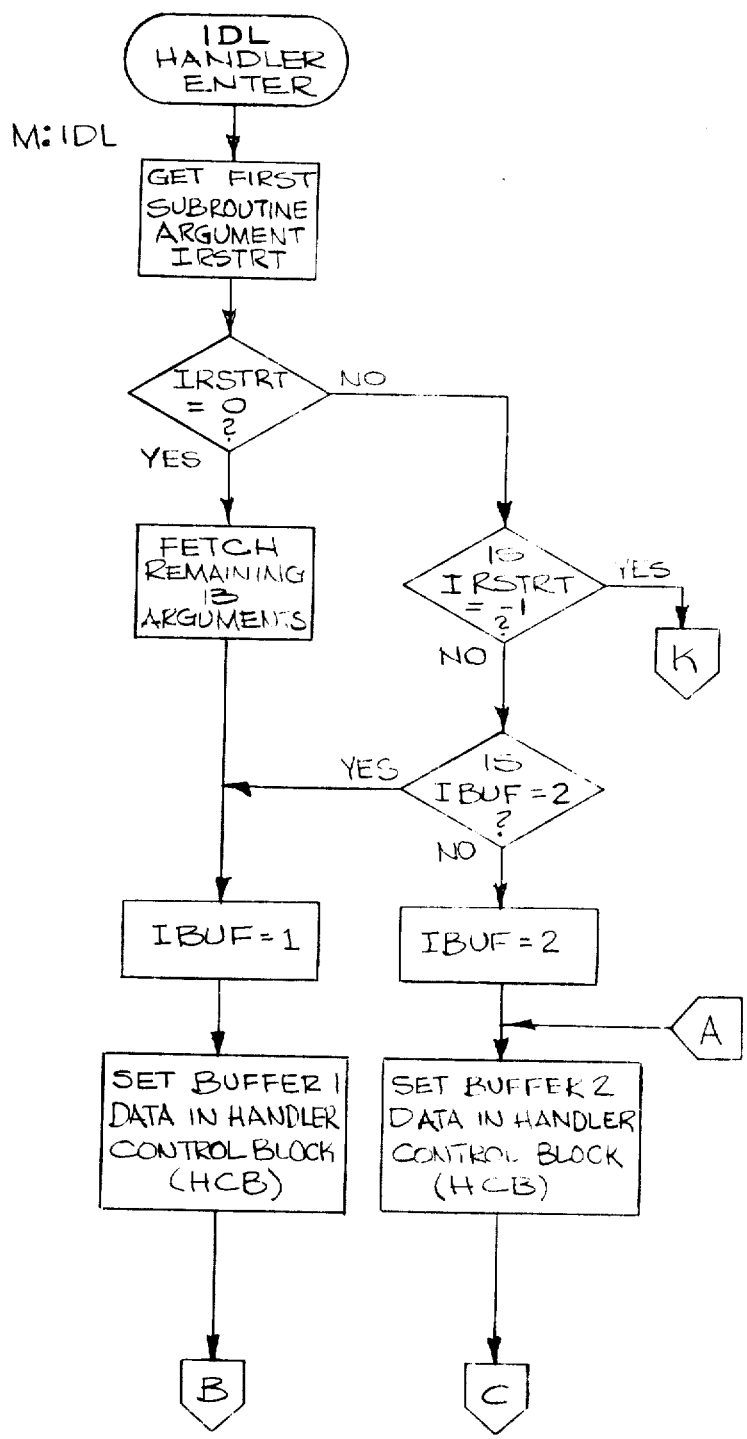
Figure 16C:
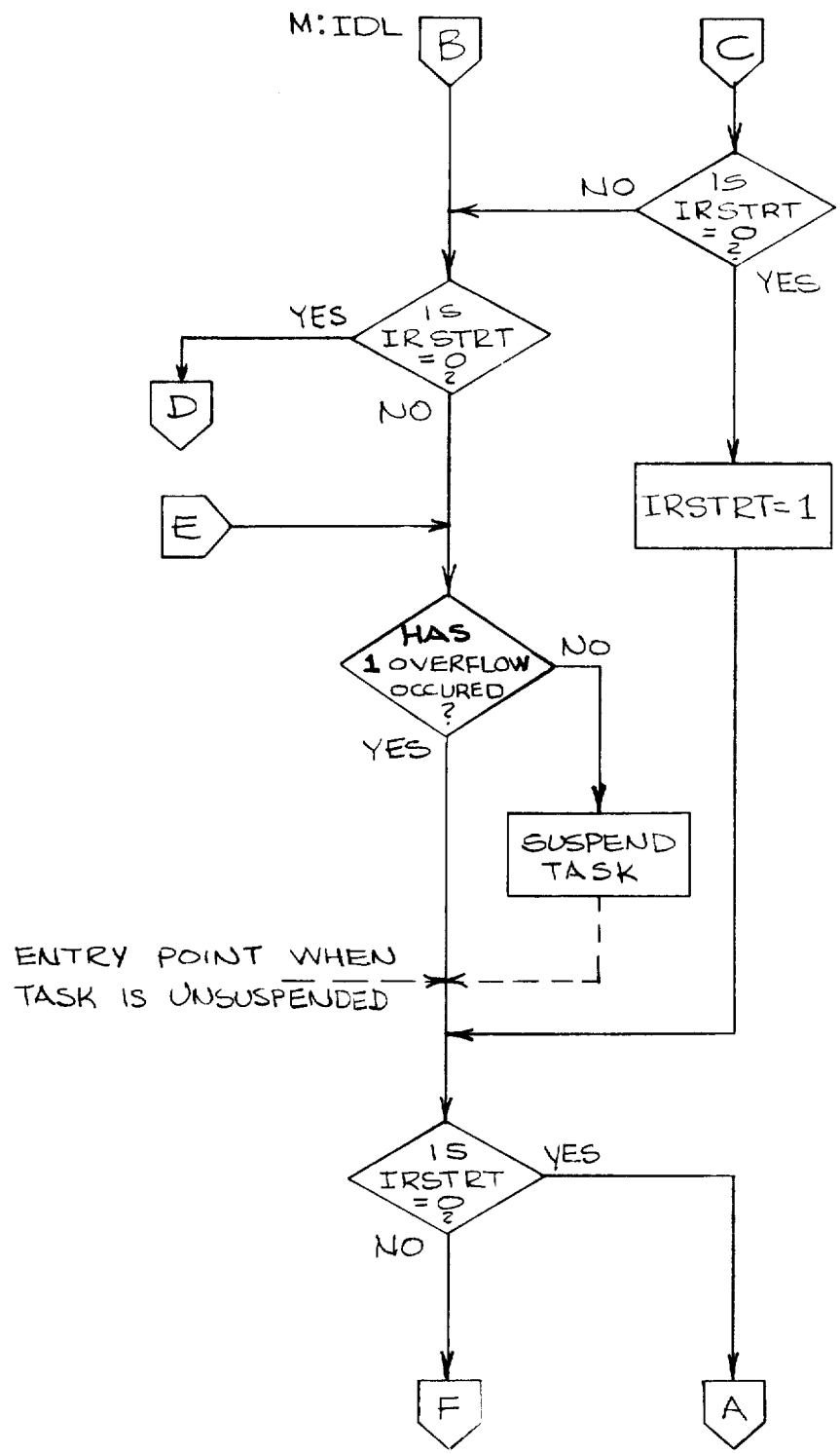

DISC MAP, see FIG. 14. Program address in disc storage 192.

CORE MAP, see FIG. 15A,B. Program address in hexadecimal core storage 194.

SERVICE PROGRAMS (198)

IDL Handler, M:IDL, see FIG. 16A-E. This routine handles all data transfers between the IDL hardware (channels 30 and 32) and the gage data input subroutine -GAGEIN. It communicates to the IDL hardware via the IDL channel driver CD:IDL. A double buffering scheme is used to speed up the total data transfer time by initiating an additional IDL transfer on both channels to a second data buffer just before exiting from the handler. In this way data can be transferred into this second buffer by the IDL hardware using service request interrupts SRI's executed in the out-of-sequence range while the gage software is budy processing data from the first buffer. When this processing is completed, the handler is re-entered. If the data transfer on the second buffer is not complete, the task is suspended until the IDL external MACRO routine detects two buffer overflow interrupts. The task is unsuspended by the IDL external MACRO routine EB:IDL when two buffer overflows have been counted. If the data transfer on the second buffer is complete, or after the task is unsuspended by EF:IDL, the buffers are effectively switched and a data transfer using buffer 1 is initiated and an exit is made from the handler. The gage software now processes the data in buffer 2 and repeats the above sequence.

A watchdog timer with a 0.5 second timeout is set before inititing each IDL transfer. If two buffer overflows are not returned within this time period, the clock routine will unsuspend the task and sets the vriable ISTAT=1 to indicate an IDl transfer timeout error.

The variable IBUF is set by this routine to indicate which buffer, 1 or 2, contains data from the last IDL transfer. The variable IRSTRT must initially be set to 0 by the calling task so that this routine knows when entry has been made for the first time. When IRSTRT=0, the double buffering mechanism is initialized. This routine then sets IRSTRT=1 to indicate that the double buffering operation is in progress. If entry to the handler is made with IRSTRT= -1, an abort IDL command is sent to both IDL chanels to stop any transfer in progress. This command is usually initiated by the calling task before doing a call exit so that all IDL transfers are halted.

This routine calls the IDL channel driver CD:IDL and utilizes the IDL external MACRO routine EB-:IDL. Therefore these routines must be linked with the IDL handler M:IDL.

IDL Handler, CD:IDL, See FIG. 17. This routine is used to transfer data from the handler control blocks (HCB) defined in the IDL handler M:IDL to the IDl hardware (channels 30 and 32). Control is transferred to this routine by loading the address of the HCB into the B register and jumping to CD:IDL (CD:IDL must be declared external). The HCB is a 9 word table having the following format:

| Word No. | Explanation | Example Using Channel 30 |
|---|---|---|
| 0 | Forced Buffer Input IDL Code | DAT X'B30' |
| 1 | Abort IDL Code | DAT X'F30' |
| 2 | Return Address — 1 | ADL RTR1-1 |
| 3 | Blank | DAT 0 |
| 4 | Buffer Input IDL Code | DAT X'530' |
| 5 | Core Location Containing Addr. to data | DATA X'11FB' |
| 6 | Number of Words to be Transferred | DAT 20 |
| 7 | Address of Data Buffer | SIZE 1 |
| 8 | SRI Address Vector (100+SRI × 2) | DAT 354 |

This routine performs three functions using the HCB table. First, an abort code (HCB — word 1) is sent out on the I/O subsystem. The lower seven bits of this word define the channel number to be aborted. Second, a forced buffer input (HCB — word O) is sent out on the I/O subsystem. This command initializes the IDL hardware on the selected channel. Third, the buffered input transfer code is sent out on the I/O subsystem to initiate the data transfer. The data is transferred into core memory from the selected IDL channel via service request interrupts (SRI). The pointers and counters used by the SRI's are set up by this routine using data supplied in the HCB's.

IDL Handler, EB:IDL, see FIG. 18. This routine is called by the POS/1 buffer overflow service request interrupt routine in the out-of-sequence instruction range in response to buffer overflow interrupts which occur when a buffered input data transfer on any of the IDL channels 30 and 32 is completed. Each entry to this routine causes the buffer overflow count word (ECB7) in the external MACRO control block to be incremented. When this count reaches 2, the task which was suspended by the IDL handler M:IDL is unsuspended. If this count is not 2, return is made to the POS/1 buffer overflow exit routine M:BOX and the state of the suspended task is unchanged. Thus, when the IDL handler M-IDL requests data from both IDL channels it clears the buffer overflow count and suspends the task. It will be unsuspended when the IDL external MACRO routine counts two completion buffer overflow interrupts.

Figure 19B:
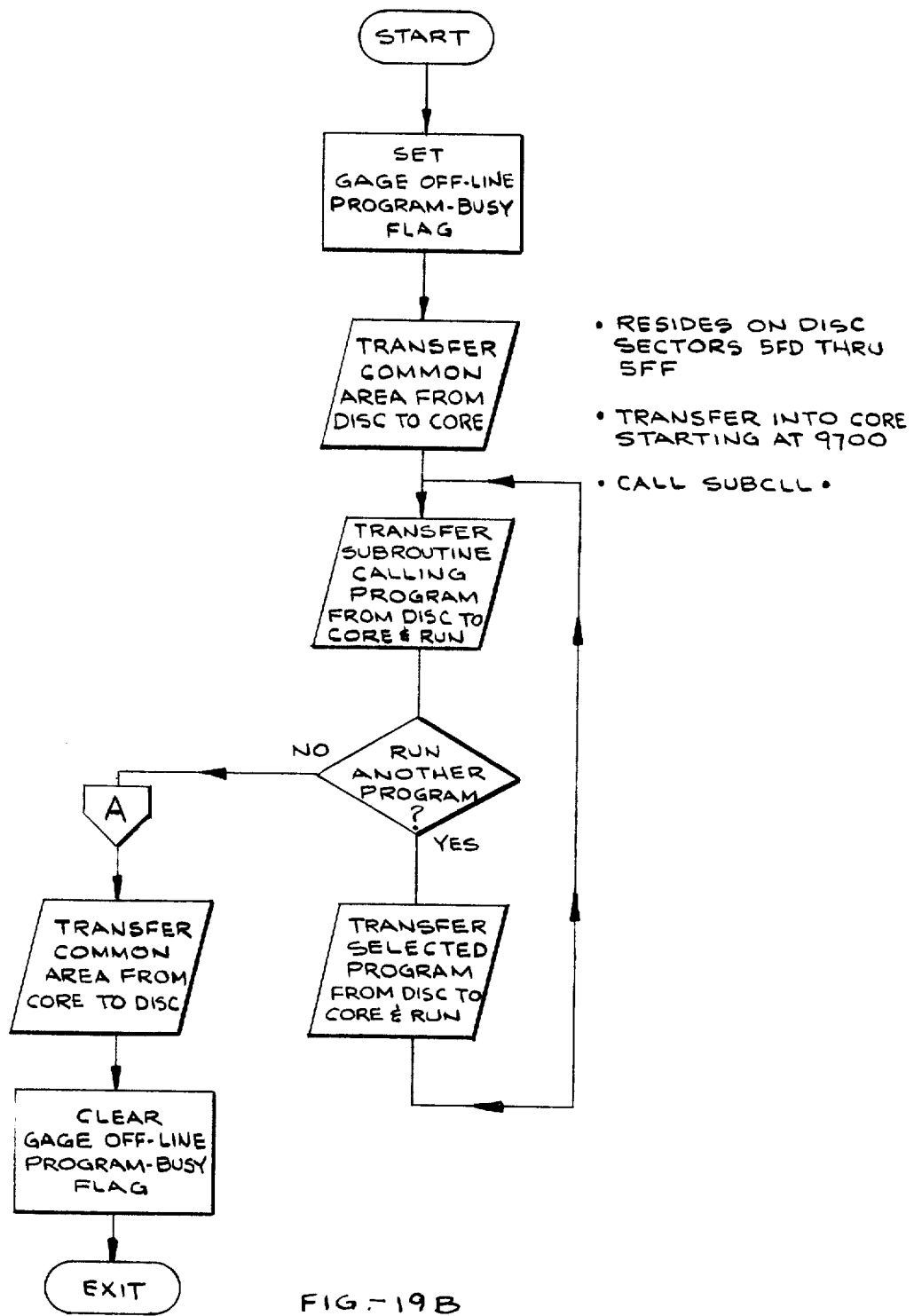

GAGTSK, see FIG. 19A-B. This disc resident task (Task 20) is an off-line task designed to read disc resident off-line gage subroutine overlays into core, transferring control to them. GAGTSK calls a particular subroutine into core in response to mnemonic parameters passed to it by the operator interactive subroutine caller overly SUBCLL. All programs and their mnemonics are described in the listing of the subroutine SUBCLL. GAGTSK also transfers a disc resident common area into core, and, if disc sector switch 12 is write enabled, writes the updated common area back to the disc when exiting from the task.

An off-line busy flag IGAGOF is set on entry to this task, and is cleared upon exit.

Figure 20A:
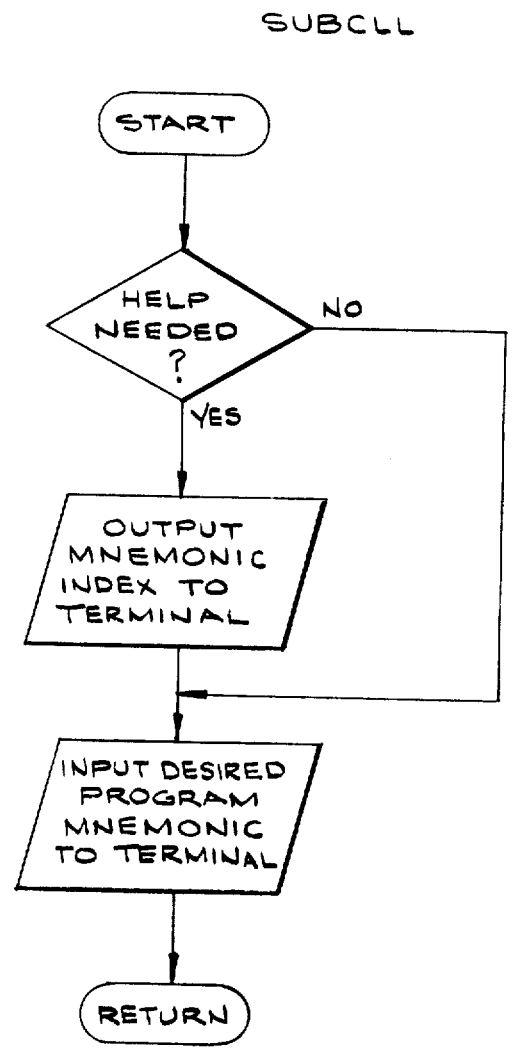

SUBCLL, see FIG. 20A-B. This disc resident subroutine is an overlay, run routine is an overlay, run in the off-line mode, by means of which an operator may interact with the gage off-line system to run any of the available off-line bar diameter gage programs. It is transferred from dic to core and run by the off-line gage tsk GAGTSK (Task 20) by means of a system monitor disc-read-and-transfer-control routine. Operator entered mnemonics determine subroutine disc sectors which are returned as subroutine parameters to GAGTSK, which in turn transfers and runs the desired subroutine overlay. Subroutine functions are described in this program listing, and are available to the operator in response to his request for assistance.

Figure 21:
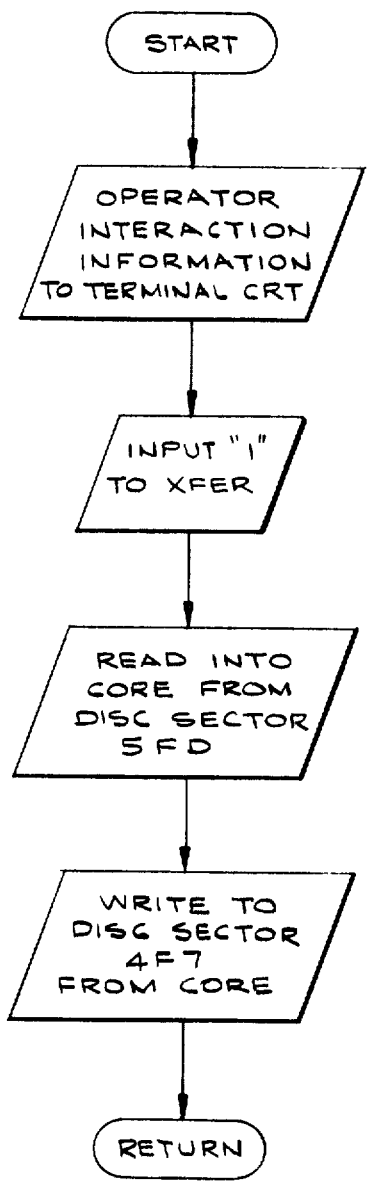

GAGTRN, see FIG. 21. This program runs in the gage off-line system. It transfer the 572 word gage data block from disc area 5FD to contro system disc area 4F7. It performs a disc-core-disc transfer using the gage common area for intermediate storage. Disc switch 10 must be write enabled.

BAR GAGE DATA PROGRAM (199)

Figure 22B:
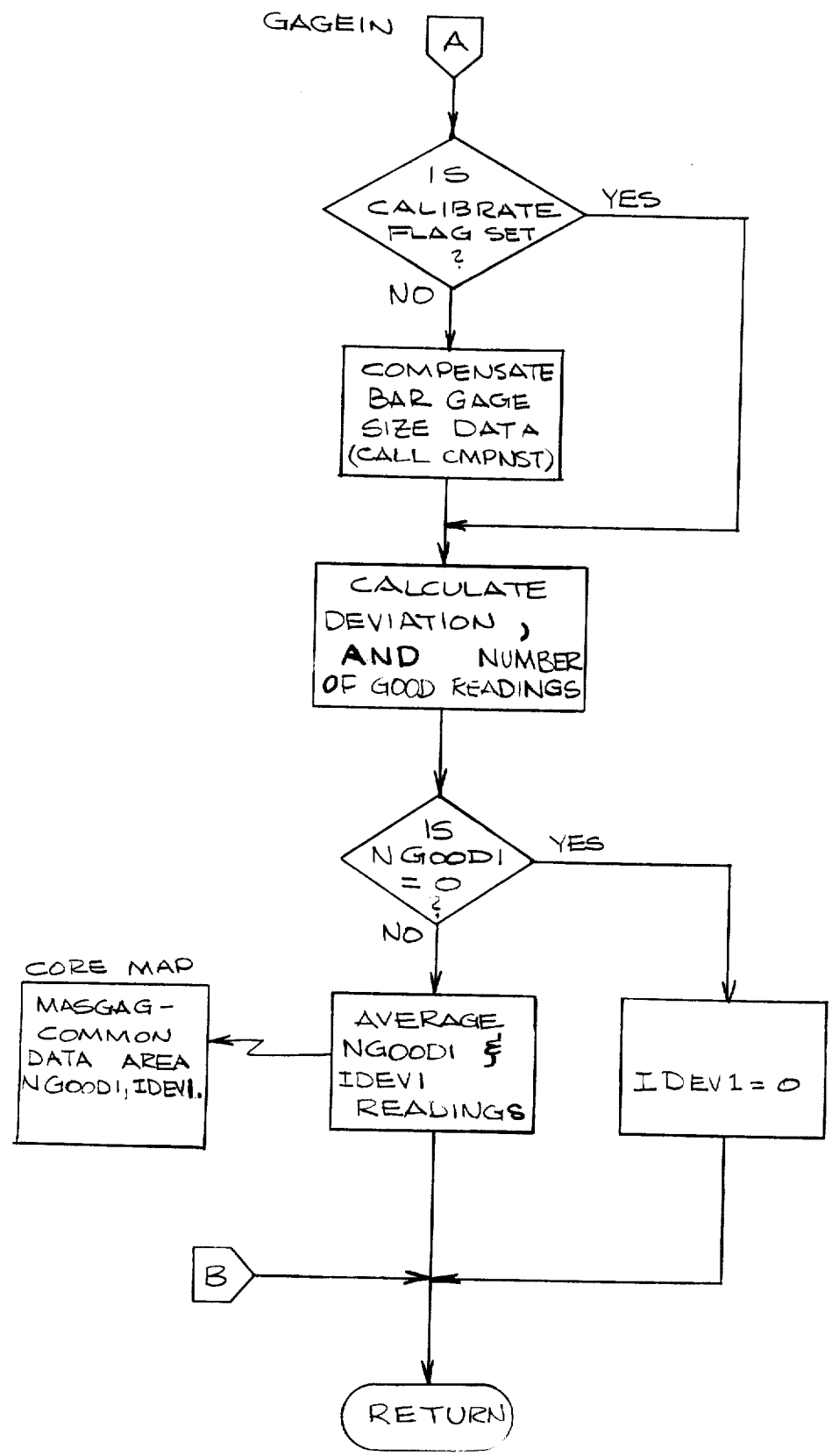

GAGEIN, see FIG. 22A-B. This auxiliary subroutine is always appended to any subroutine requiring bar gage data. It calls the IDL handler, (M:IDL, CD:IDL, EB:IDL) also appended, to actually acquire the bar diameter data, and the compensate subroutine (CMPNST), also appended, if recalibration is required. It averages the good readings returned, bar diameter, calculates deviations, and stores the results in common tables. Validity tests are made and error flags set as needed.

COMPENSATION PROGRAM (200)

Figure 23:
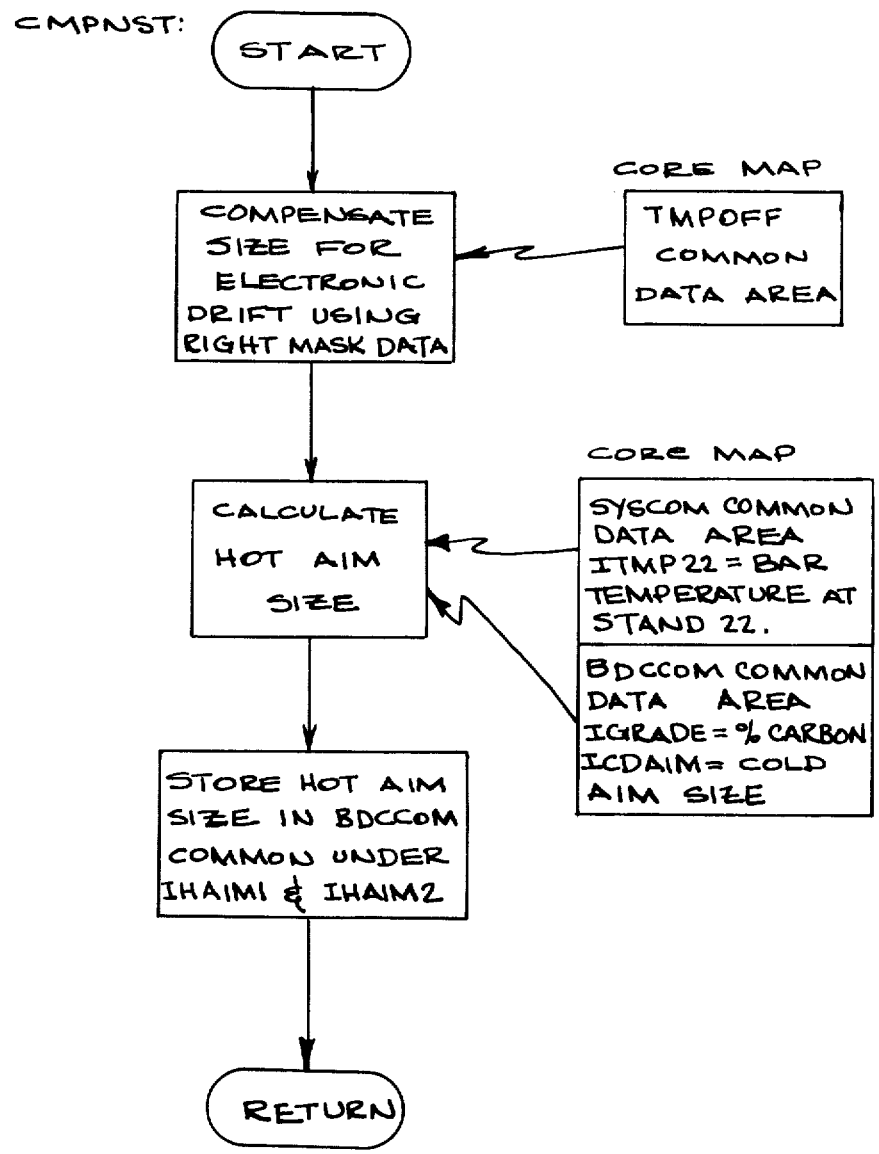
FIG. 23 is a flow chart of the computer COMPENSATION PROGRAM.
Figure 24C:
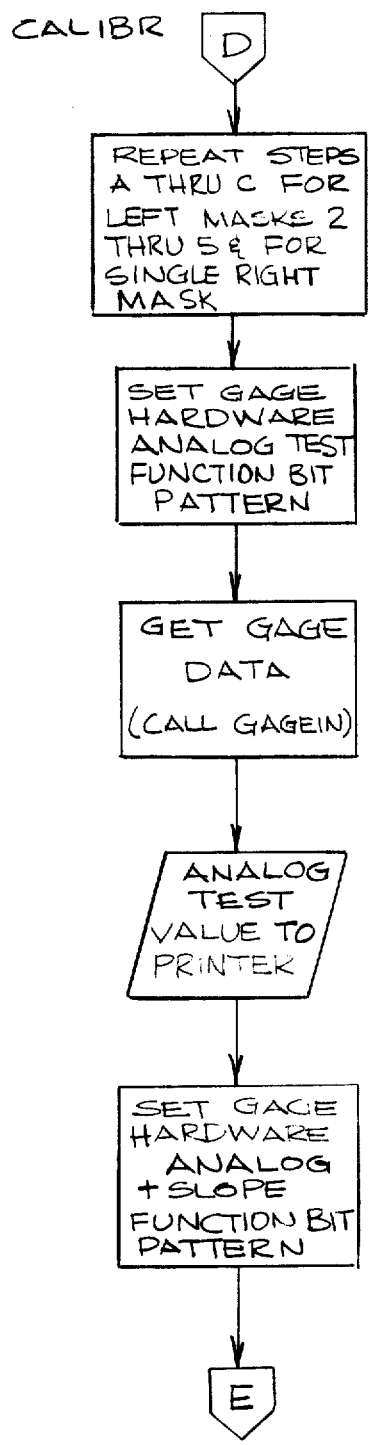
Figure 24E:
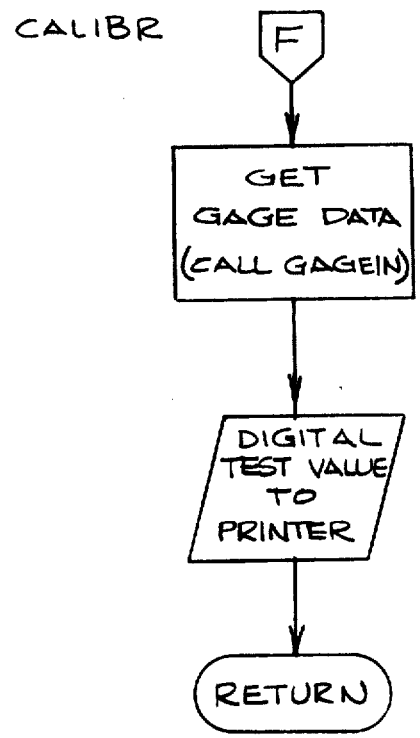
Figure 25A:
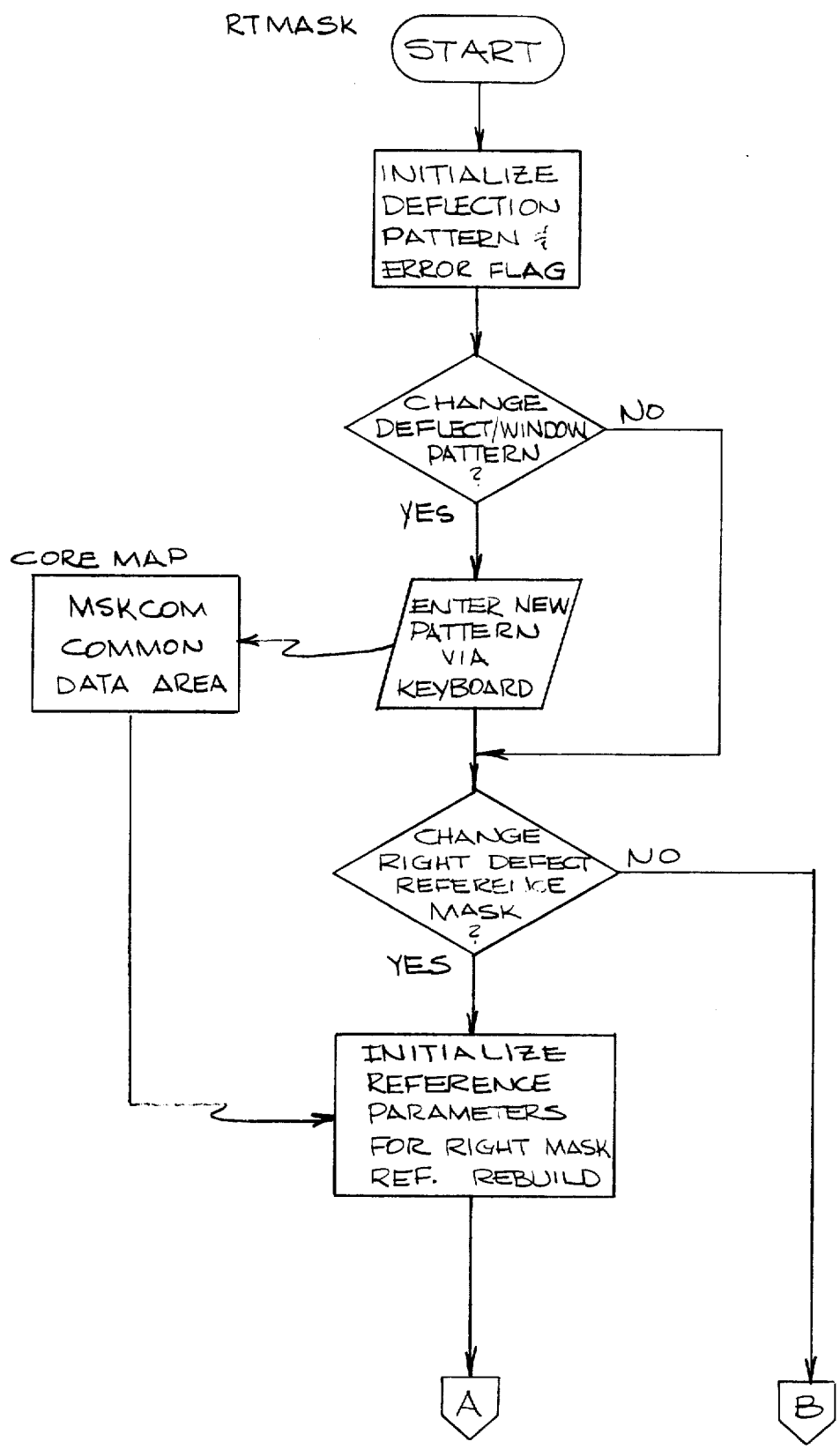
Figure 25B:
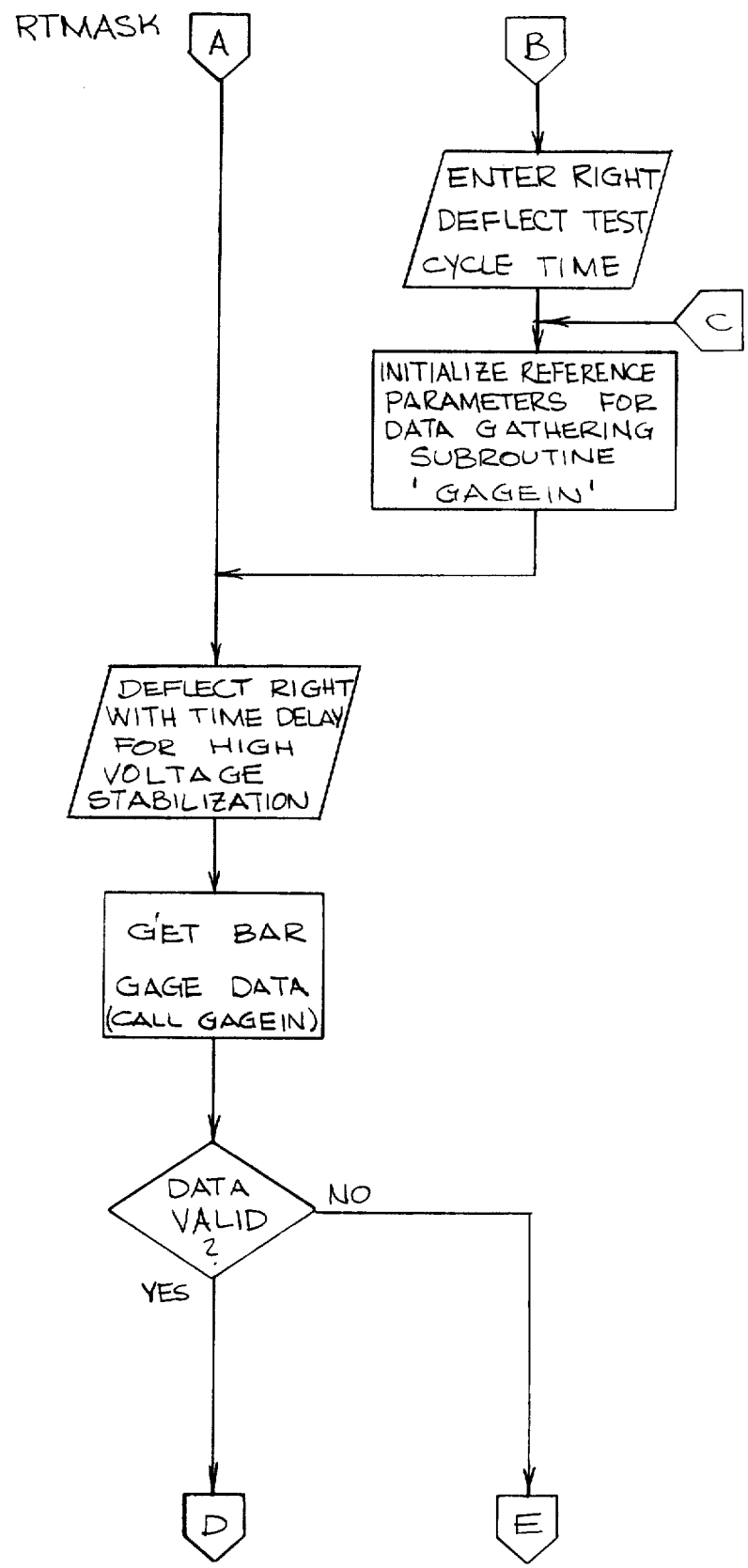

CMPNST, see FIG. 23. This auxiliary subroutine is appended to any subroutine requiring gage diameter data automatic recalibration. CMPNST performs this recalibration by correcting all bar gage data with correction data generated in on-line program GAGRCL. In addition, this subroutine calculates the hot aim size IHAIML using an internally stored compensation equation and the following three variables:

(1) IDCAIM — cold aim size
(2) ITMP22 — bar temperature at stand 22
(3) IGRADE — carbon composition of the bar

CALIBRATION PROGRAM (201)

CALIBR, see FIG. 24A-F. This program runs in the off-line gage system. It does not require operator intervention. Its purpose is to establish a performance log for the gage on printer 63. It performs the following functions:
1. Deflect to each left and right mask 95, 94 and:
   a. Measure and print size of each mask;
   b. Calculate and print deviation from stored mask value;
   c. Measure and print (+) slope value;
   d. Measure and print (−) slope value;
   e. Print window value used for each mask.
   2. Measure and print analog test size, + and − slope values.
3. Measure and print digital test.
4. Print calibration update values used by recalibration.

RECALIBRATION PROGRAMS (202)

RTMASK, see FIG. 25A-D. This disc resident subroutine is an overlay, run in the off-line mode, by means of which may of the following bar diameter gage functions may be exercised:
1. Right deflect electronic window gates may be changed to accommodate changes in image-dissector 90 parameters.
2. Right deflect diameter reference values, stored in common tables, may be updated to compensate for drift, component aging, etc.
3. If no changes are desired, the program can be run cyclicly, with a deviation printout on printer 63 to observe electronic and temperature related drift, see FIG. 25D.

Upon return from this subroutine, the image-dissector 90 sweep is returned to the center, a full electronic window gate is restored, and the current through the back-light source lamps is reversed to prolong lamp life. This program is designed primarily as a long-term drift check tool, with the additional capability of updating the window gate and reference table value. It is invoked by the subroutine SUBCLL, and requires operator interaction.

Figure 26A:
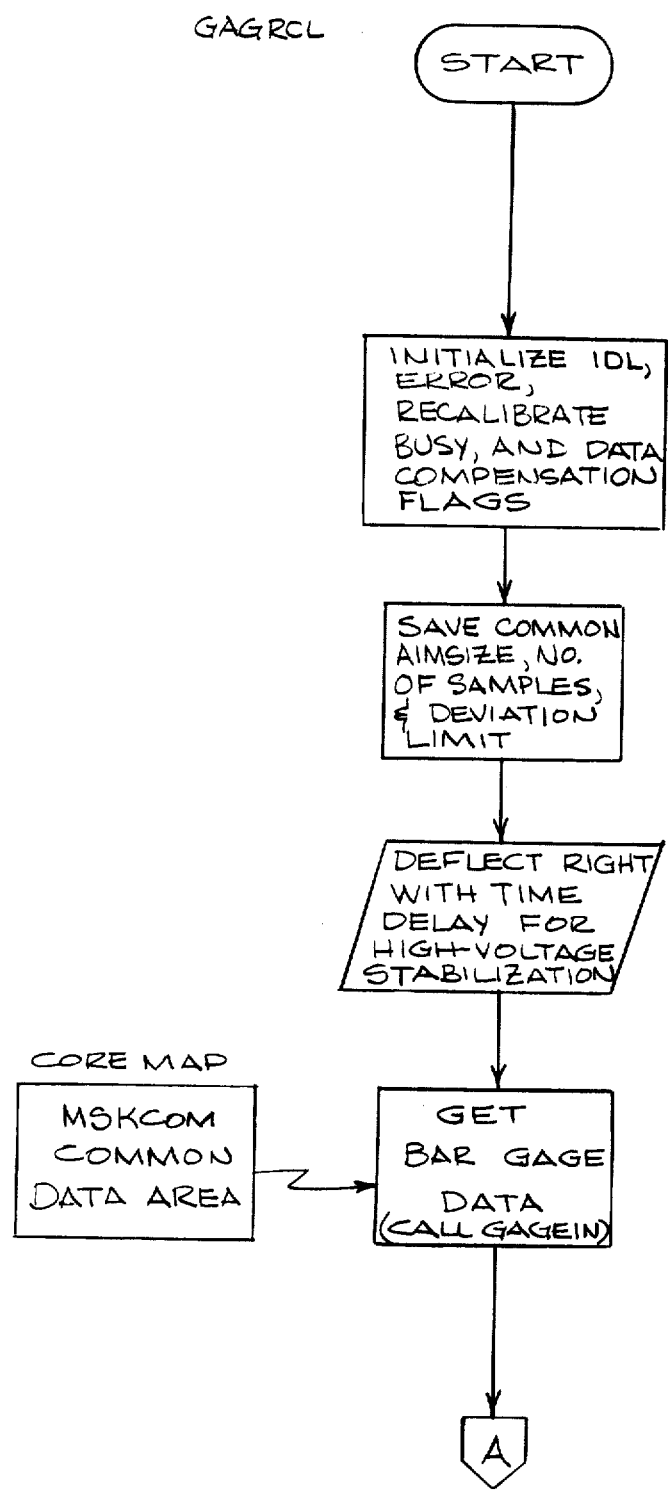
Figure 26C:
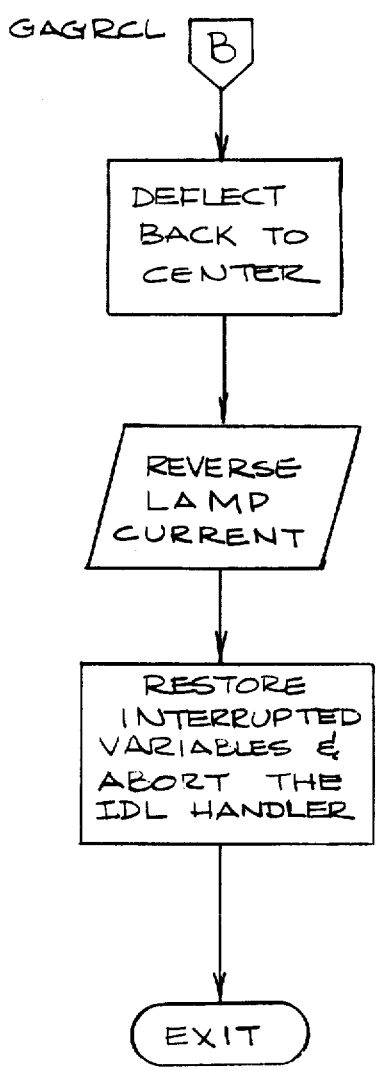
Figure 27B:
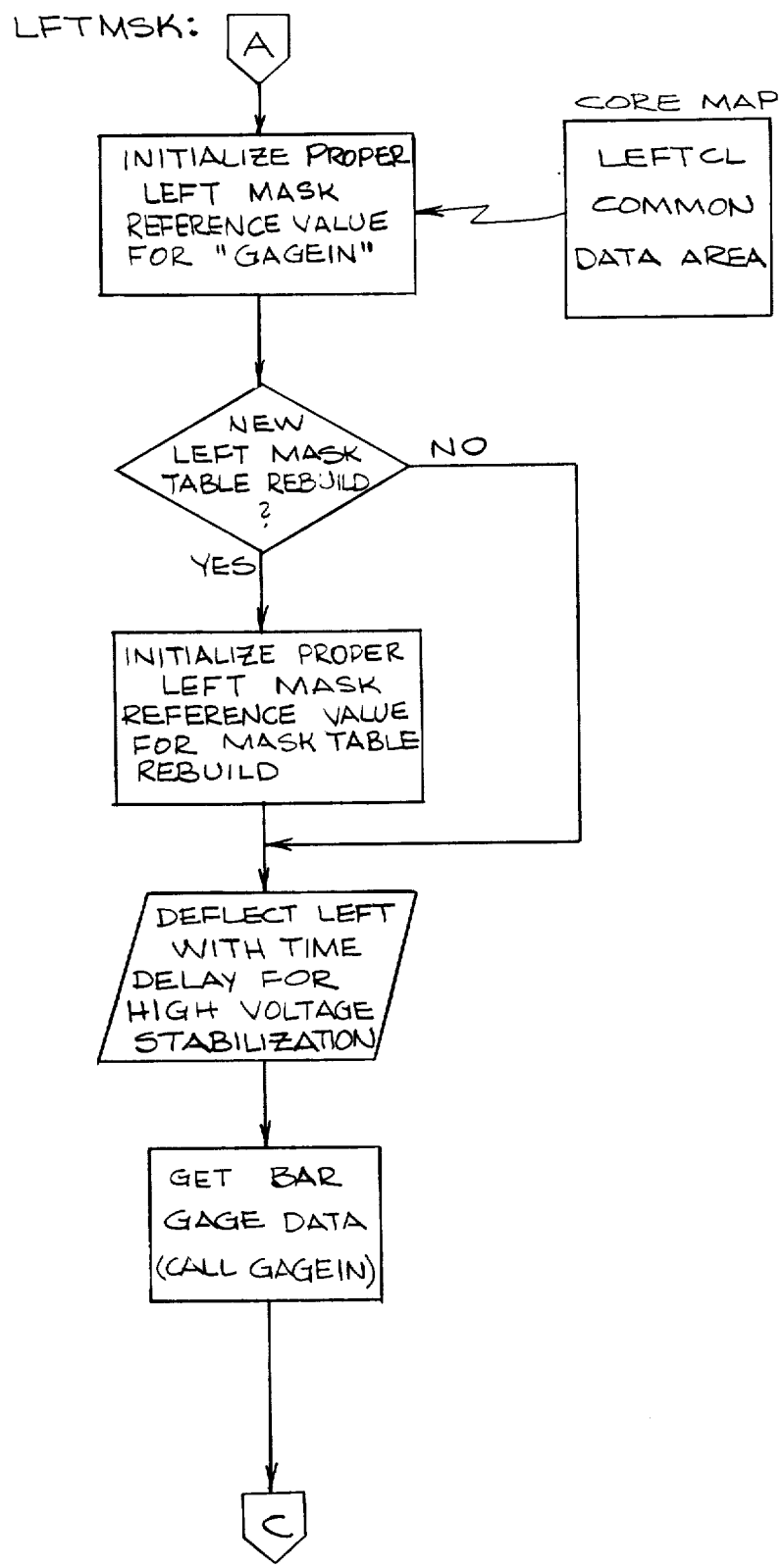
Figure 27C:
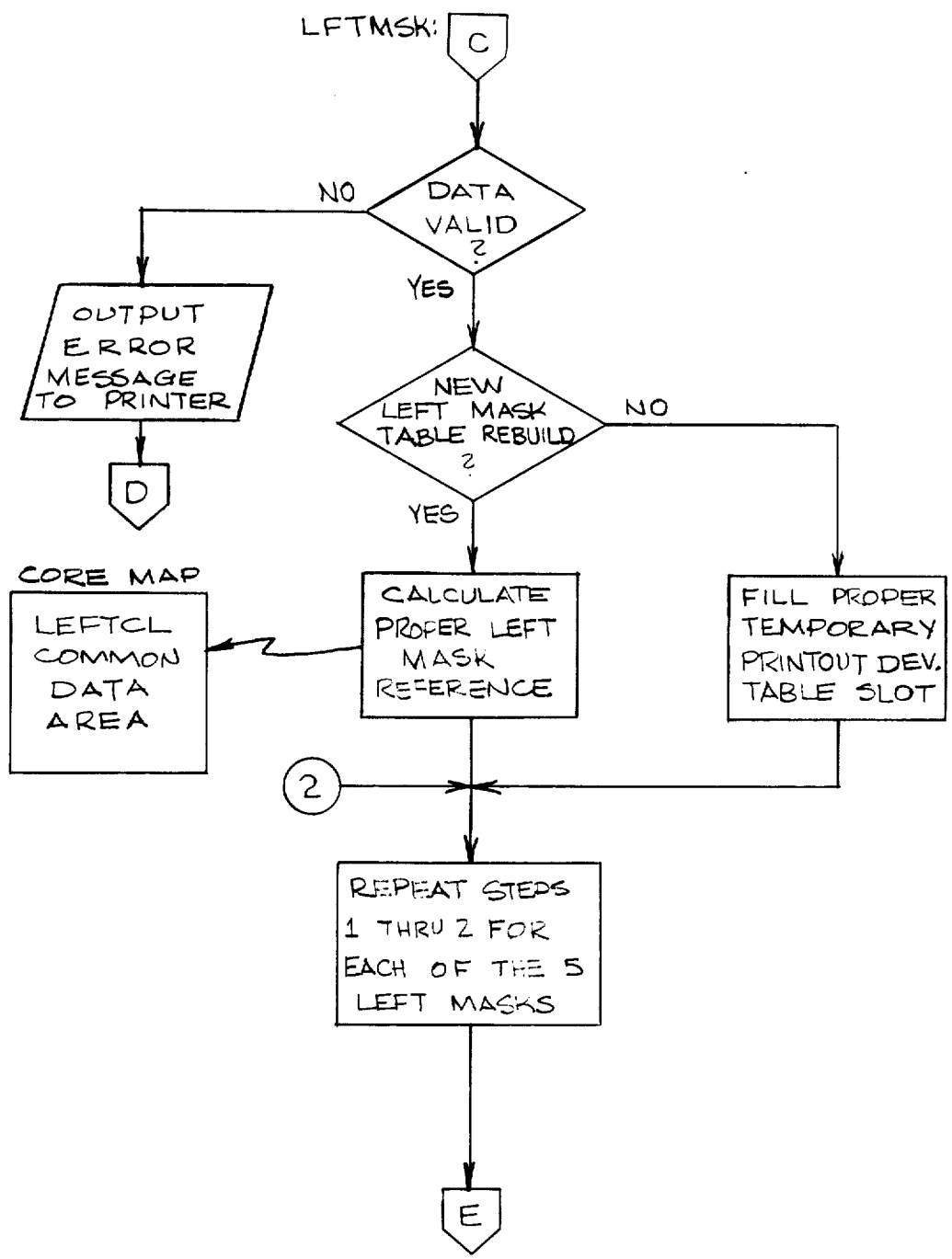

GAGRCL, see FIG. 26A-C. This program is run under the on-line system. It requies no operator interaction. Its purpose is to automatically recalibrate the bar diameter gage periodically by updating the drift correction term ITMPI. It deflects the camera sweep to scan the right mask 94 and equate the drift term with any deviations from an initial calibration reference value. Before exit, the sweep is returned to the center with a normal window, and the back-light-source current is reversed.

The automatic recalibration system provides the means to maintain gage accuracy by checking the calibration whenever bar 10 is not in the gage field-of-view. This recalibration system is implemented after bar 10 clears the gage, and before the next one passes through, as determined by a signal from hot metal detector electonics 57. This is accomplished using software to calculate a scaling factor based on the differences between an on-line measurement of a known internal reference, right mask 94, and an off-line measurement of the same internal reference made during system calibration. Following a recalibration, the measurements on the next bar 10 in the gate field-of-view is corrected using this scaling factor.

The key to the recalibration measurement is masked photocathode electrode 91 on the front of the image dissector tube 90. The mask pattern is shown in FIG. 4. The photocathode electrode 91 has five 0.1 inch wide masks spaced 0.1 inches apart on the left side and a single 0.25 inch mask centered on the right side. Construction and operating features of image dissector tube 90 and photocathode 91 are described above in FIGS. 3, 4, 5. There are "C" scan, "R" scan and "L" scan positions established by X-axis bias. There is no distinction between right mask camera signals and bar camera signals. If no adjustments are made to the electronics, the measurement of the right mask at time $T_1$ should be the same as the measurement at time $T_2$. Any differences are assumed to be electronic drift.

The recalibration system only uses right mask 94 to calculate the correction factors. The five left masks 95 are only used in the off-line calibration system for linearity checks. The right mask for camera head 31 is measured and saved on the disc by executing the right mask program "RT" in the off-line calibration system. The variable is stored in core in common data area MSKCOM under the name IMASK1. The data is transferred from disc to common area MSKCOM in core when the control system is activated.

The on-line measurement of right mask 94 is performed by the GAGRCL task. After hot metal detector 55 detects the tail end of bar 10 being rolled clearing the gage, GAGRCL deflects the dissector tube image to the right and measures mask 94. The difference between the measured value from camera 1 and IMASK1 is stored in variable ITMP1 in common data area TMPOFF. This value represents changes in the gage measurement from the initial calibration to the on-line calibration.

The on-line correction function is performed in subroutine CMPNST using variable ITMP1. A slope correction is applied to each measurement based on the following formula:

FOR CAMERA HEAD 31:

$$\text{Corrected Bar Size} = \text{Bar Size} - \left( \frac{\text{Bar Size} \times \text{ITMP1}}{0.5''} \right) \quad \text{(Eq.1)}$$

As an example for an ITMP1 = 0.0006 inch:

$$\text{The corrected size for a } 0.5'' \text{ bar} = 0.5'' - \frac{[0.5'' \times 0.0006'']}{0.5''} = 0.4994'' \quad \text{(Eq.2)}$$

$$\text{The corrected size for a } 1.0'' \text{ bar} = 1.0'' - \frac{[1.0'' \times 0.0006'']}{0.5''} = 0.9988'' \quad \text{(Eq.3)}$$

$$\text{The Corrected size for a } 1.5'' \text{ bar} = 1.5'' - \frac{[1.5'' \times 0.0006'']}{0.5''} = 1.4982'' \quad \text{(Eq.4)}$$

The amount of correction for a ½ inch bar is equal to the value ITMP1. Similarly, the correction is 2 × ITMP1 for a 1.0 inch bar and 3 × ITMP1 for a 1.5 inch bar. This is because lens 86 reduction is ½. Thus a ½ inch bar is projected as a 0.25 inch shadow on photocathode electrode 91 which is the approximate width of right mask 94.

LFTMSK, see FIG. 27A–E. This disc resident subroutine is an overlay, run in the off-line mode, by means of which any of the following bar diameter gage functions may be exercised:

1. Left-deflect electronic window gates, used to select each of the five left-deflect bar references on left mask 95, may be changed to accommodate changes in image-dissector tube 90 parameters.

2. Left-deflect diameter reference values, stored in a common table, may be updated to compensate for drift, component aging, etc.

3. If no changes are desired, the program can be run cyclicly, with a deviation printout on printer 63 of each of the five left-deflect etched bar references, to observe electronic and temperataure related drift, see FIG. 27E. Maximum cycle time is 32,000 seconds.

Upon return from this subroutine, the image-dissector tube 90 sweep is returned to the center, a full electronic window gate is restored, and the current through the back-light source lamps is reversed, to prolong lamp life. This program is designed as a field-of-view and electronic drift check tool, with the additional capability of updating the window gates and reference table values. It is invoked by the subroutine SUBCLL, and requires operator interaction.

We claim:

1. A recalibration system for an electro-optical system which gages a dimension of a moving bar, comprising:
   (a) electronic camera head means aimed to receive an image of the moving bar on a central portion of an electronically scanned image responsive device and generate a raw camera signal, each said image responsive device having one or more calibration masks alongside the central portion thereof;
   (b) electronic circuit means including means for processing the raw camera signal to produce a bar size pulse, a sweep generator for driving the scanning of the image responsive device, and means for offsetting the scan from a central sweep to a calibration mask;
   (c) calculator means assimilating the bar size pulse and calibration and/or recalibration command signals for:
      .1 calibrating the gaging system using a standard bar,
      .2 recalibrating the gaging system without a bar by controlling the selection and use of a calibration mask,
      .3 storing the recalibrated bar size data; and
   (d) means for utilizing the stored data to indicate and/or record recalibrated bar size measurement.

2. The system of claim 1 wherein the electronic camera head means is back-lighted.

3. The system of claim 1 wherein the electronic camera head means includes a telecentric lens system to permit imaging of bar movement anywhere in a prescribed field-of-view.

4. The system of claim 1 wherein the sweep generator is circuited for a signal axis scan of the image responsive device.

5. The system of claim 1 wherein the sweep generator is circuited for a linear bidirectional sweep cycle having equal upsweep and downsweep half cycles.

6. The system of claim 1 wherein the sweep generator is circuited for a nonlinear bidirectional sweep cycle.

7. The system of claim 1 wherein the electronic camera head means includes a variable-gain image responsive device, and the electronic circuit means includes a self-balancing measuring loop having an automatic gain control circuit for varying image device gain to maintain output current constant.

8. The system of claim 1 wherein the camera pulse processing means includes an autocorrelator for removing camera signal noise.

9. The system of claim 1 wherein the camera pulse processing means includes differentiated pulse edge detection circuitry for each raw camera signal and an autocorrelator to remove noise from each differentiated raw camera signal.

10. The system of claim 1 wherein the calculator means is a programmed computer adapted to include a program for recalibrating the gaging system in response to the recalibration command signal.

11. The system of claim 1 wherein the calculator means is a programmed computer adapted to include a program for calibrating the gaging system in response to the calibration command signal.

12. A recalibration method for an electro-optical method which gages a dimension of a moving bar, which method comprises:
   (a) imaging a moving bar upon a central portion of an electronically scanned image responsive device in an electronic camera means and generating corresponding raw camera signals, said image responsive device having one or more calibration masks alongside the central portion thereof;
   (b) generating a sweep signal for driving the scanning of the image responsive device;
   (c) processing the raw camera signals to produce a bar size pulse which represents the bar dimension;
   (d) assimilating the bar size pulse and calibration and/or recalibration command signals, and calculating:
      .1 a calibration of the gaging system using a standard size bar,
      .2 a recalibration of the gaging system without a bar by selecting a calibration mask and offsetting the scan from the central sweep to said mask, and
      .3 a plot of recalibrated bar size data and storing recalibrated bar size data; and
   (f) utilizing the stored data to indicate and/or record a recalibrated bar size measurement.

13. A recalibration system for an electro-optical system which gages a dimension of a moving bar, comprising:
   (a) electronic camera head means aimed to receive an image of the moving bar on a central portion of an electronically scanned image responsive device and generate a raw camera signal having at least one error, each said image responsive device having one or more calibration masks alongside the central portion thereof;
   (b) electronic circuit means including means for processing the raw camera signal to produce a bar size pulse, a sweep generator for driving the scanning of the image responsive device, and means for offsetting the scan from a central sweep to a calibration mask;
   (c) calculator means assimilating the bar size pulse and at least one corresponding error-compensating signal for: .1 compensating the bar size pulse for one or more sources of error as a function of a corresponding one or more error-compensating signals, thereby to produce a corrected bar size pulse,
      .2 calibrating the gaging system using a standard bar,
      .3 recalibrating the gaging system without a bar by controlling the selection and use of a calibration mask,
      .4 storing the recalibrated corrected bar size data; and
   (d) means for utilizing the stored data to indicate and/or record recalibrated corrected bar size measurement.

14. The system of claim 13 wherein the calculator means is a programmed computer adapted to receive first and second error-compensating signals and include a compensation program that will effectively correct the bar size pulse for offset and drift factors in response to the first and second error-compensating signals, respectively.

15. The system of claim 13 further including means for sensing bar temperature and producing a bar temperature signal as a third error-compensating signal, and wherein the calculator means is a programmed computer adapted to receive the third error-compensating signal and include a compensation program that will effectively correct the bar size pulse to a cold size proportional to the bar temperature signal representing the third error-compensating signal.

16. The system of claim 15 further including means for producing a bar composition signal as a fourth error-compensating signal, and wherein the calculator means is a programmed computer also adapted to receive the fourth error-compensating signal and to include a compensation program that will effectively correct the bar size pulse for bar composition effect on temperature correction in response to the third and fourth error-compensating signal.

* * * * *